US009495356B2

(12) United States Patent
Farahbod

(10) Patent No.: US 9,495,356 B2
(45) Date of Patent: Nov. 15, 2016

(54) AUTOMATED INTERACTIVE VISUAL MAPPING UTILITY AND METHOD FOR VALIDATION AND STORAGE OF XML DATA

(75) Inventor: Farzad Farahbod, El Cerrito, CA (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 11/393,598

(22) Filed: Mar. 30, 2006

(65) Prior Publication Data

US 2007/0239749 A1 Oct. 11, 2007

(51) Int. Cl.
| | |
|---|---|
| *G06F 17/27* | (2006.01) |
| *G06F 17/30* | (2006.01) |
| *G06F 11/36* | (2006.01) |
| *G06F 17/22* | (2006.01) |

(52) U.S. Cl.
CPC ....... *G06F 17/2725* (2013.01); *G06F 11/3604* (2013.01); *G06F 11/3612* (2013.01); *G06F 17/30914* (2013.01); *G06F 17/30917* (2013.01); *G06F 17/30923* (2013.01); *G06F 17/2247* (2013.01); *G06F 17/27* (2013.01); *G06F 17/2705* (2013.01)

(58) Field of Classification Search
CPC ........... G06F 17/2247; G06F 17/2725; G06F 17/227; G06F 17/30569; G06F 11/3604; G06F 11/3612; G06F 17/30923; G06F 17/30929; G06F 17/30935; G06F 17/27; G06F 17/2705; G06F 17/30914–17/30917
USPC .......... 715/234, 237; 717/141–143
See application file for complete search history.

(56) References Cited

U.S. PATENT DOCUMENTS

| | | | |
|---|---|---|---|
| 6,604,100 B1 * | 8/2003 | Fernandez et al. | 707/3 |
| 6,675,355 B1 * | 1/2004 | Demopoulos et al. | 715/233 |
| 6,810,414 B1 * | 10/2004 | Brittain | 709/219 |
| 6,964,015 B2 * | 11/2005 | Demopoulos et al. | 715/233 |
| 7,013,306 B1 * | 3/2006 | Turba et al. | |
| 7,036,073 B2 * | 4/2006 | Jones et al. | 715/237 |
| 7,055,093 B2 * | 5/2006 | Tozawa et al. | 715/234 |
| 7,069,504 B2 * | 6/2006 | Mani et al. | 715/239 |

(Continued)

OTHER PUBLICATIONS

Baraband et al., "PowerForms: Declarative Client Site Form Field Validation", World Wide Web, Baltzer Science Publishers, Bussum, NL. vol. 3, No. 4, Dec. 2000, p. 1-20.*

(Continued)

*Primary Examiner* — Eric Wiener
(74) *Attorney, Agent, or Firm* — Kali Law Group P.C.

(57) ABSTRACT

A method, apparatus and computer program product is provided for automatic validation of Extensible Markup Language (XML) data through interactive visual mapping, before storing the validated XML data into a target destination. The method allows a user to interact with a graphic user interface (GUI) to obtain mapping of an XML source document or its fragment and the target destination through at least one XML validation schema, and to automatically obtain XML data validations. The GUI is menu-driven and displays the XML data in the native format and a selection of the XML validation schemas. Interactions with the GUI automatically generate an XML validation mapping definition document and a validation code. The target destination can be one or more XML columns, a web service call, a standalone application call, a function's or stored procedure's input parameter of XML type and it may be located in a heterogeneous RDBMS environment.

21 Claims, 18 Drawing Sheets

(56) References Cited

U.S. PATENT DOCUMENTS

| | | | |
|---|---|---|---|
| 7,089,491 B2* | 8/2006 | Feinberg et al. | 715/234 |
| 7,096,224 B2* | 8/2006 | Murthy et al. | 707/100 |
| 7,130,862 B2* | 10/2006 | Easton | 707/102 |
| 7,134,072 B1* | 11/2006 | Lovett et al. | 715/234 |
| 7,146,422 B1* | 12/2006 | Marlatt et al. | 709/227 |
| 7,158,990 B1* | 1/2007 | Guo et al. | |
| 7,168,035 B1* | 1/2007 | Bell et al. | 715/234 |
| 7,174,327 B2* | 2/2007 | Chau et al. | |
| 7,191,394 B1* | 3/2007 | Ardeleanu et al. | 715/241 |
| 7,197,515 B2* | 3/2007 | Rivers-Moore et al. | 707/200 |
| 7,200,805 B2* | 4/2007 | Carlson et al. | 715/237 |
| 7,210,097 B1* | 4/2007 | Clarke | G06F 17/30917 707/999.202 |
| 7,240,119 B2* | 7/2007 | Ascoli et al. | 709/230 |
| 7,281,206 B2* | 10/2007 | Schnelle et al. | 715/227 |
| 7,281,211 B2* | 10/2007 | Jeannette et al. | 715/234 |
| 7,296,017 B2* | 11/2007 | Larcheveque et al. | 707/6 |
| 7,296,223 B2* | 11/2007 | Chidlovskii et al. | 715/234 |
| 7,320,007 B1 | 1/2008 | Chang | |
| 7,325,187 B2* | 1/2008 | Yashiro | G06F 17/227 715/234 |
| 7,366,735 B2* | 4/2008 | Chandrasekar et al. | |
| 7,370,028 B2* | 5/2008 | Doughan | 707/1 |
| 7,370,270 B2* | 5/2008 | Feng | 715/234 |
| 7,373,595 B2* | 5/2008 | Jones et al. | 715/234 |
| 7,437,374 B2* | 10/2008 | Chen et al. | 707/101 |
| 7,506,273 B2* | 3/2009 | Lahiri | 715/854 |
| 7,681,119 B2* | 3/2010 | Fong et al. | 715/234 |
| 7,747,945 B1* | 6/2010 | Babka | G06F 17/2247 705/4 |
| 2001/0051961 A1 | 12/2001 | Duxbury | |
| 2002/0078068 A1 | 6/2002 | Krishnaprasad et al. | 707/104.1 |
| 2002/0129059 A1* | 9/2002 | Eck | 707/513 |
| 2003/0140308 A1 | 7/2003 | Murthy et al. | 715/500 |
| 2003/0142128 A1 | 7/2003 | Reulein et al. | |
| 2003/0167446 A1* | 9/2003 | Thomas | 715/513 |
| 2003/0182452 A1* | 9/2003 | Upton | 709/246 |
| 2004/0044987 A1* | 3/2004 | Kompalli et al. | 717/100 |
| 2004/0064803 A1 | 4/2004 | Graves et al. | 717/104 |
| 2004/0073870 A1* | 4/2004 | Fuh et al. | 715/513 |
| 2004/0117759 A1 | 6/2004 | Rippert, Jr. et al. | |
| 2004/0163041 A1 | 8/2004 | Engel | 715/509 |
| 2004/0172616 A1* | 9/2004 | Rothschiller et al. | 717/114 |
| 2004/0205562 A1* | 10/2004 | Rozek et al. | 715/513 |
| 2004/0205656 A1 | 10/2004 | Reulein et al. | |
| 2004/0226002 A1 | 11/2004 | Larcheveque et al. | 717/126 |
| 2005/0004885 A1* | 1/2005 | Pandian et al. | 707/1 |
| 2005/0039166 A1* | 2/2005 | Betts et al. | 717/114 |
| 2005/0049996 A1* | 3/2005 | Srinivasan | G06F 17/30917 |
| 2005/0050068 A1* | 3/2005 | Vaschillo et al. | 707/100 |
| 2005/0055631 A1 | 3/2005 | Scardina et al. | 715/513 |
| 2005/0060317 A1 | 3/2005 | Lott et al. | 707/10 |
| 2005/0060645 A1* | 3/2005 | Raghavachari et al. | 715/513 |
| 2005/0071342 A1 | 3/2005 | Calusinski | 707/100 |
| 2005/0177543 A1* | 8/2005 | Chen et al. | 707/1 |
| 2005/0246159 A1* | 11/2005 | Perla et al. | 704/8 |
| 2005/0262115 A1* | 11/2005 | Hu et al. | 707/100 |
| 2005/0273703 A1* | 12/2005 | Doughan | 715/513 |
| 2006/0004729 A1* | 1/2006 | Zhilyaev et al. | 707/3 |
| 2006/0004844 A1* | 1/2006 | Rothschiller et al. | 707/102 |
| 2006/0041838 A1* | 2/2006 | Khan | 715/513 |
| 2006/0059169 A1* | 3/2006 | Armishev | 707/100 |
| 2006/0112327 A1* | 5/2006 | Iwasaki | 715/513 |
| 2006/0167905 A1* | 7/2006 | Liu et al. | 707/100 |
| 2006/0167929 A1* | 7/2006 | Chakraborty et al. | 707/102 |
| 2006/0184539 A1* | 8/2006 | Blake et al. | 707/10 |
| 2006/0197982 A1* | 9/2006 | Bell et al. | 358/1.18 |
| 2006/0288268 A1* | 12/2006 | Srinivasan et al. | 715/505 |
| 2007/0112851 A1* | 5/2007 | Tomic et al. | 707/104.1 |
| 2007/0113172 A1* | 5/2007 | Behrens | G06F 17/2229 715/239 |
| 2007/0150809 A1* | 6/2007 | Yoshida | G06F 17/2229 715/235 |
| 2007/0168849 A1* | 7/2007 | Bell et al. | 714/799 |
| 2009/0089658 A1* | 4/2009 | Chiu | G06F 17/2705 715/234 |
| 2009/0132906 A1* | 5/2009 | Aoki | 715/234 |
| 2012/0079364 A1* | 3/2012 | Agarwal | G06F 8/456 715/234 |

OTHER PUBLICATIONS

Altova, Inc., "XML Spy 4.0 Manual," Altova Inc. & Altova GmbH, coyright 1998-2001, Chapters 1, 2, and 6, encompassing pp. 1-17, 18-90, and 343-362.*

Varlamis et al., "Bridging XML-Schema and relational databases. A system for generating and manipulating relational databases using valid XMl_documents," DocEng '01, Nov. 9-10, 2001, Copyright 2001, ACM 1-58113-432-010110011, pp. 105-114.*

* cited by examiner

```
<book price="10.0" name="foo">
  <year>1992</year>
  <cover>paper</cover>
```
```
  <author xmlns='urn:bookstore-schema'
  xmlns:xsi="http://www.w3.org/2001/XMLSchema-instance'>
      <first-name>Herman</first-name>
      <last-name>Melville</last-name>
  </author>
```
```
</book>
```

FIG. 3

```
<DATA_VALIDATION>
    <SRCTYPE type="TABLE" name="book">
        <COLUMN name="bookinfo">
            <XMLSRC>this contains xml source for this column</XMLSRC>
            <VALIDATIONS>
                <VALIDATION LANGUAGE="SQL" type="FRAGMENT"
                id="author xml fragment" xpath="book/author">
                    <XMLSCHEMAID ID="books.xsd"
                    targetnamespace="urn:bookstore-schema" />
                </VALIDATION>
            </VALIDATIONS>
        </COLUMN>
    </SRCTYPE>
</DATA_VALIDATION>
```

FIG. 4

```
<DATA_VALIDATION>
    <SRCTYPE type="TABLE|VIEW|PROCEDURE" name="">
        <COLUMN name="">
            <XMLSRC></XMLSRC>
            <VALIDATIONS>
                <VALIDATION LANGUAGE="SQL|C#|C++|VB|PHP
                type="FRAGMENT|DOC" id="" xpath="" >
                    <XMLSCHEMAID ID="" targetnamespace="" />
                </VALIDATION>
            </VALIDATIONS>
        </COLUMN>
    </SRCTYPE>
</DATA_VALIDATION>
```

TRANSACTION-XML Designer ————1102

```
<GFX_Tran xmlns:xsi="http://www.w3.org/2001/XMLSchema-instance">
 <event>event1</event>
 <subEvent>subEvent1</subEvent>
 <sourceSystem>sourceSystem1</sourceSystem>
 <timestamp>timestamp1</timestamp>
 <Trade>
  <tradeDate>1900-01-01</tradeDate>
  <entryDate>1900-01-01</entryDate>
  <bookingLocation>bookingLocation1</bookingLocation>
  <tradeType>tradeType1</tradeType>
  <buySell>buySell1</buySell>
  <Note>
   <note>note1</note>
   <noteType>noteType1</noteType>
  </Note>
  <Party>
   <partyType>Trader</partyType>
   <Id>
    <id>id1</id>
```

☐ Validate Option ——1106

| Xml Schema | Location | Validate | Target Namespace | XML Fragments |
|---|---|---|---|---|
|  |  |  |  |  |
| HRSCHEMA | HR | ☐ |  |  |
| GLOBALTRANSACTION.Xsd | SALES | ☑ | [...] |  |

AUTOMATED INTERACTIVE VISUAL MAPPING UTILITY AND METHOD FOR VALIDATION AND STORAGE OF XML DATA

RELATED APPLICATION

The present invention is related to a co-pending U.S. patent application entitled "Automated Interactive Visual Mapping Utility For Transformation and Storage of XML Data", filed concurrently, Ser. No. 11/393,223 assigned to the assignee of the present invention and fully incorporated herein by reference.

BACKGROUND OF THE INVENTION

1. Field of the Invention

The present invention generally relates to database management systems, and, more particularly, to an automated interactive visual mapping utility and method for validation and storage of Extensible Markup Language (XML) data within computer-based database management systems.

2. Description of Related Art

The increasing popularity of electronic commerce has prompted many companies to turn to application servers to deploy and manage their applications effectively. Quite commonly, these application servers are configured to interface with a database management system (DBMS) for storage and retrieval of data. This often means that new applications must work with distributed data environments. As a result, application developers frequently find that they have little or no control over which DBMS product is to be used to support their applications or how the database is to be designed. In many cases, developers find out that data critical to their application is spread across multiple DBMSes developed by different software vendors.

A repository, such as a relational database, provides an environment to securely store and share XML documents and XML schemas. Authorized users of a repository have secure access to important XML documents and XML schemas at any time and from anywhere. By using a repository system, that can contain one or more relational database systems, users can locate and retrieve the latest version of XML documents and XML schema documents.

The standard approach for storing XML documents in a relational database has been through customized specific third-party software, such as programs, database command line arguments or code-based applications. A software program reads an XML document and appropriate XML schema(s), performs proper validation of the XML document contents and then stores the validated XML document in one or more database tables. While this software program facilitates the data validation process, someone has to develop its code. Presently, there is no single generic intuitive solution through which all or some portions of XML documents can be validated quickly, against one ore more XML schemas, during updates or inserts of XML data into target destinations, such as columns of database tables.

Another problem occurs when a repository engine, such as a database management system, tries to validate a large number of XML documents against multiple XML schemas. The XML data validation is usually performed against one or more XML schemas, or namespaces that are defined in XML schemas, and can be applied on entire or some portions (fragments) of an XML document. When validation errors occur during inserts or updates of target destinations there may be hundreds of errors and it can take a user a long time to identify and correct these errors. Furthermore, a user has to know how to map the XML document's fragments to their target destinations and appropriate XML schemas and write the validation code to accomplish the validation.

Therefore, there is a need to provide a method and a system that can be used in an easy, efficient and intuitive way for validation of XML data during updates or inserts into a target destination, where the target destination of the validated XML data may be one or more XML columns residing in one or more databases of a heterogeneous Relational DataBase Management System (RDBMS) environment.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method for automatic validation of Extensible Markup Language (XML) data through interactive visual mapping, before storing the validated XML data into a target destination. The method allows a user to interact with a graphic user interface (GUI) to obtain mapping of an XML source document or its fragment and the target destination through at least one XML validation schema, and to automatically obtain XML data validations. The GUI is menu-driven and displays the XML data in the native format, and a selection of the XML validation schemas. Interactions with the GUI automatically generate an XML validation mapping definition document and a validation code. The target destination may be one or more XML columns, a web service call, a standalone application call, a function's or stored procedure's input parameter of XML type and it can be located in a heterogeneous RDBMS environment.

Another preferred embodiment of the present invention is a system implementing the above-mentioned method embodiment of the present invention.

Yet another preferred embodiment of the present invention includes a computer program product embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIG. 3 illustrates an exemplary XML source document with a fragment selected for validation, according to the preferred embodiments of the present invention;

FIG. 4 illustrates an exemplary XMLValidation Mapping Definition document code excerpt, according to the preferred embodiments of the present invention;

FIG. 11 illustrates an XML Designer window, according to the preferred table column validation embodiments of the present invention;

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized, and structural and functional changes may be made without departing from the scope of the present invention.

The present invention is directed to a system, method and computer program product embodying a program of instructions executable by a computer to perform the method of the present invention for automatic validation of Extensible Markup Language (XML) data through interactive visual mapping, before storing the validated XML data into a target destination. It is implemented in a user interactive validation utility which can be used in an easy, efficient and intuitive way to perform automated interactive mapping and validation during user's interactions with a visual graphic user interface (GUI) of the present invention.

The method allows a user to interact with the GUI to obtain mapping of an XML source document or its fragment and the target destination through at least one XML validation schema and to automatically obtain XML data validations. The GUI is menu-driven and displays the XML data in the native format with a selection of the XML validation schemas. Interactions with the GUI automatically generate an XML validation mapping definition document and a validation code.

The interactive validation utility of the present invention is used for automatic validation of one or more XML documents or XML document fragments against one or more XML validation schemas, accomplished through an interactive visual dynamic mapping process. An is XML document can be dissected into fragments, based on user's selection of target destinations, and an appropriate XML validation schema is used for each fragment during the validation process. Each XML validation schema may be represented with an XML validation schema's namespace. Validated XML documents or XML document fragments are stored after validation in target destinations. The target destination of the validated XML data may be any database object declared as XML format type, such as one or more XML columns, a web service call, a standalone application call, a function's or stored procedure's input parameter of XML type, etc. Target destinations of the validated XML data may reside in one or more databases of a heterogeneous Relational DataBase Management System (RDBMS) environment. Thus, the interactive validation utility provides the means to apply validation rules to XML data prior to reaching their final target destination, such as a database, thus optimizing data storage utilization and system efficiency.

Figure 1:
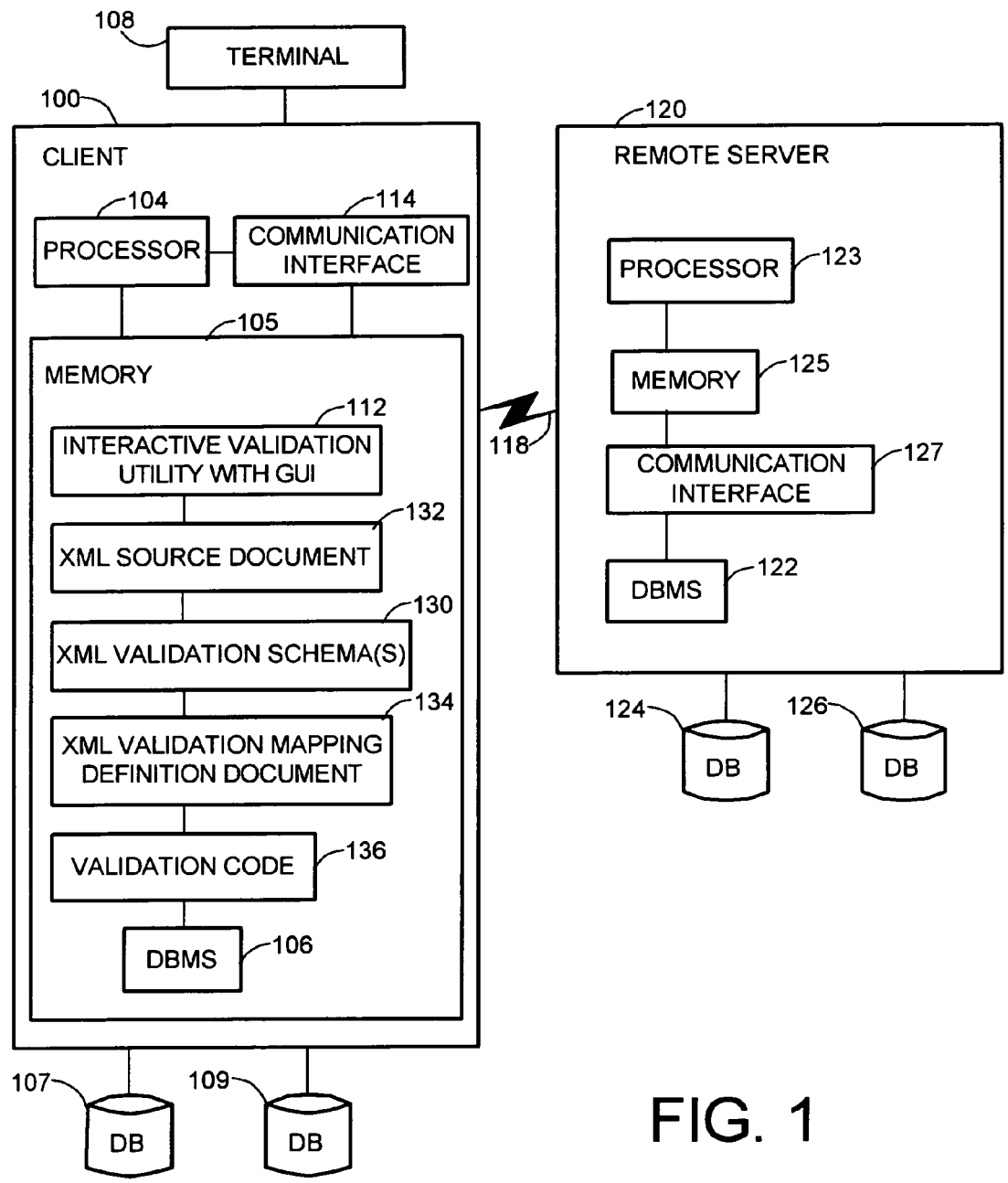
FIG. 1 illustrates a block diagram of an exemplary computer hardware and software environment, according to the preferred embodiments of the present invention.

FIG. 1 illustrates an exemplary computer hardware and software environment usable by the preferred embodiments of the present invention to enable the automatic data validation method of the present invention. FIG. 1 includes a client 100 having a client terminal 108 and one or more conventional processors 104 executing instructions stored in an associated computer memory 105. The memory 105 can be loaded with instructions received through an optional data storage drive or through an interface with a computer network. Client 100 further includes a user interactive validation utility 112 of the present invention with a graphical user interface (GUI) accessed from the terminal 108 for interactions with a user and preferably interfaced with a web browser. Client 100 may use at least one standard Structured Query Language (SQL), XML or Web communication interface 114 connecting the client 100 to one or more optional remote servers 120 via a network communication line 118, to obtain access to databases of single or multiple data sources, such as a database server DataBase Management System (DBMS) 122, and data storage devices 124, 126, each of which may be a DB2® or non-DB2 source, may reside on different systems and may store data in different formats. Optional remote server 120 has its own processor 123, communication interface 127 and memory 125.

Processor 104 on the client side may be connected to one or more DBMSes 106 and electronic data storage devices 107, 109, such as disk drives, that store one or more databases. The data storage devices 107, 109, 124, 126 may include, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiments of the present invention. Alternatively, the program steps can be received into the operating memory 105 from a computer over the network.

Operators of the client terminal 108 use a standard operator terminal interface (not shown) with a data input and selection device, such as a keyboard, touch screen, track ball, mouse, etc., to transmit electrical signals to and from the client 100 that represent commands for performing various tasks, such as search and retrieval functions and queries, against the database stored on the electronic data storage device 107, 109, 124, 126. In the present invention, these queries conform to the Structured Query Language (SQL) standard, and invoke functions performed by DBMS 106, 122, such as a Relational DataBase Management System (RDBMS) software. In the preferred embodiments of the present invention, the RDBMS software is the DB2® product, offered by IBM® for the AS400® or z/OS® operating systems, the Microsoft® Windows® operating systems, or any of the UNIX®-based operating systems supported by the DB2®. Those skilled in the art will recognize, however, that the present invention has application to any DBMS software that uses SQL, and may similarly be applied to non-SQL queries.

FIG. 1 further illustrates a software environment of the present invention which enables the preferred embodiments of the present invention. For that purpose the client 100 of the system shown in FIG. 1 includes the user interactive validation utility 112 with the GUI, which incorporates preferred methods of the present invention for interactive dynamic mapping and automatic validation of XML data. Validated XML data are stored in a target destination, such as database(s) of at least one data source, such as DBMS 106, and data storage devices 107, 109. In a network environment, the target destination can be database(s) of at least one remote data source, such as DBMS 122, and data storage devices 124, 126, when the validated XML data are transmitted across the network communication line 118. However, the present invention is not limited to a network environment and it is applicable to a simpler system where the validated XML data are stored in only one database of the data storage device 107 or 109 and there is no remote server 120.

Each data storage device 107, 109, 124, 126 may have one or more relational databases, each having a plurality of tables, and the client 100 and/or remote server 120 may host an RDBMS environment that is used for storage of XML validation schema documents 130, XML data stored in XML source documents 132 to be validate against XML validation schema(s) 140, and documents created during the validation process, such as an XML validation mapping definition document 134 and a validation code 136. Target destination for the validated XML document may be one or more XML columns of at least one database residing on data storage device 107 or 109 or in databases stored in multiple data storage devices 107, 109, 124, 126 and connected via network communication line 118. In some preferred aspects network communication line 118 can provide communication via wireless technology. In other preferred aspects the target destination may be an input or input/output parameter of a stored procedure. While the user interactive validation utility 112 is running, XML source documents 132, XML validation schema(s) 140, WL validation mapping definition document 134 and validation code 136 are located in memory 105, as shown in FIG. 1.

Figure 2:
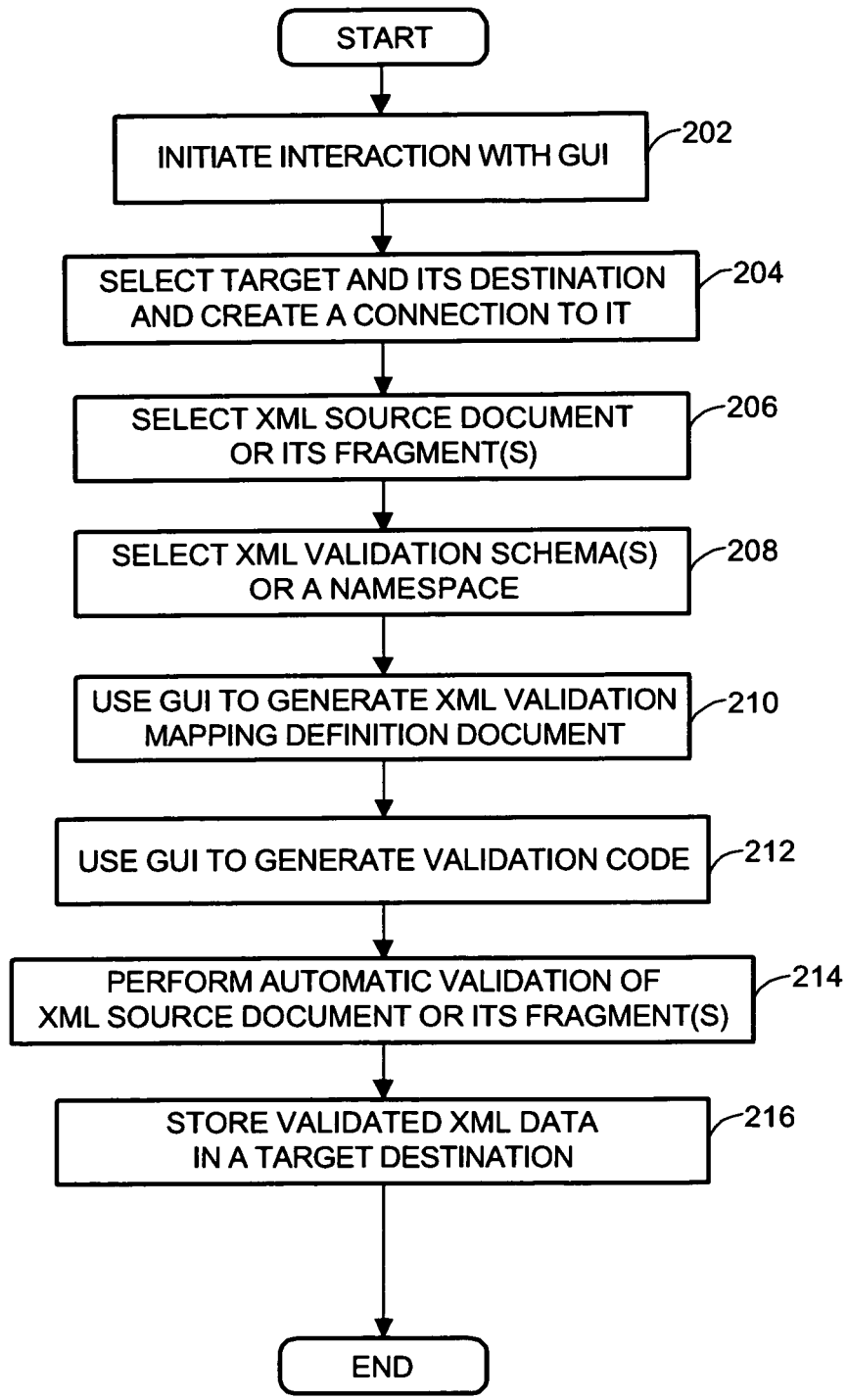
FIG. 2 illustrates a flowchart of an exemplary method for automatic XML data validation, according to the preferred embodiments of the present invention.

FIG. 2 illustrates a flowchart of an exemplary method that performs interactive dynamic mapping and automatic XML data validation, according to the preferred embodiments of the present invention, implemented in the user interactive validation utility 112 illustrated in FIG. 1. The preferred embodiments of the present invention perform validation of XML data from the XML source document 132 by applying validation rules to XML data prior to reaching their final, target destination, such as a database, selected during interactions with a user. The user interactive validation utility 112 performs automatic validation of one or more XML source documents 132 or XML source document fragments against one or more XML validation schemas 130 through a dynamic mapping process.

According to the preferred method embodiment of the present invention, in step 202 of FIG. 2, a user initiates validation of XML data from at least one XML source document 132 against at least one XML validation schema 130, by initiating interaction with the GUI of the user interactive validation utility 112 via terminal 108 input device. In step 204, the user selects a target destination, located in client 100 or remote server 120 system's data storage device 107, 109, 124, 126, and creates a connection to it. The target destination may be one or more database tables and their columns, previously declared as XML type columns, to receive all or a portion of each XML source document 132. The XML source documents are Extensible Markup Language is (XML) documents, residing in a data storage device 107, 109, 124, 126 or entered via network prior to validation.

An example, shown in FIG. 3, illustrates an exemplary XML source document with a fragment selected for validation, where the validated fragment will be applied to an XML column target destination, named 'bookinfo', of a table named 'book'.

In step 206, the user selects an entire XML source document 132 or its fragments that require validation. Each fragment block may be selected by using the GUI to draw a box around it. XPath code is generated automatically by the user interactive validation utility 112 to identify the selected XML source document fragment block or the XML source document. In the XML document shown in FIG. 3, the box that the user draws creates an XML fragment named 'author', and the XPath to the box is named 'book/author'.

Next, in step 208, using the GUI the user selects at least one XML validation schema 130, previously registered in the database, or its namespace. The registered XML validation schemas are documents that reside in a data storage device, and an XML validation schema namespace is presented inside a registered XML validation schema by a namespace attribute. Each registered XML validation schema can have only one namespace and vice versa.

In the exemplary XML source document shown in FIG. 3, for the XML column 'bookinfo' of the table 'book', the user selects the XML validation schema, which has a namespace called 'urn:bookstore-schema'. The technique by which the user selects the registered XML validation schema or its namespace, for the purpose of validation, is described later in several examples of implemented embodiments of the present invention.

After the user finalizes all selections of steps 202-208, in step 210 the user interactive validation utility 112 of the present invention automatically generates an XML Validation Mapping Definition document 134, which can be saved in a file of the data storage device 107, 109, 124, 126, or may reside in memory 105 while the user interactive validation utility is running. An exemplary XML Validation Mapping Definition document 134 code excerpt is shown in FIG. 4.

The generated XML Validation Mapping Definition document 134 contains all user validation mapping specifications. Based on the XML Validation Mapping Definition document 134, in step 212 the user interactive validation utility 112 automatically creates validation code 136 used for automatic validation of the XML source document 132. The validation code 136 may be at least one script, such as a Structured Query Language (SQL) script, but it is not limited to SQL scripts and it can be in other programming languages, such as the one of the fourth generation languages C#, Java, Virtual Basic, Hypertext Preprocessor, or C++. The validation code 136 defines the manner in which all or some portions of the XML source document 132 are validated against the XML validation schema(s) 130 for the target destination selected in step 204.

Following is an exemplary validation code automatically generated as a SQL script by the present invention.

Insert into book (bookinfo) values (XMLVALIDATE2(X ACCORDING TO XMLSCHEMA URI 'urn:bookstore-schema'));

In this example, X is either an XML source document fragment or an entire XML source document and the XMLSCHEMA URI parameter is the selected XML validation schema namespace that is registered in the database.

The validation code generation in the present invention is not limited to a specific RDBMS or programming language. The exemplary SQL script is generated for an IBM® DB2® database and utilizes its XMLVALIDATE2 command to access the DB2® validation engine. However, with the user interactive validation utility 112 of the present invention one can also generate the validation code 136, from the XML Validation Mapping Definition document 134, for other database management systems by adding an XML document style sheet (XSLT) for the specific RDBMS.

The generated XML Validation Mapping Definition document 134 contains all user validation mapping specifications, acquired through user's interaction with the GUI, and includes the programming language information and XPath information. In an XML Validation Mapping Definition document 134 the programming language type is defined via a LANGUAGE information tag (SQL, C#, Java, Hypertext Preprocessor, Virtual Basic, C++) to specify the generated validation code 136 type. It also contains information about the target destination, such as the type tag, which can either be TABLE/VIEW or PROCEDURE; the name tag, such as an XML column name, table name, view name, function, stored procedure name or subcomponent name; the validation type tag, such as FRAGMENT or DOC, indicating whether the entire XML source document or only its fragment needs to be validated against a selected XML validation schema or its namespace; and XML validation schema location. If specified, the XPath tag points to an XML source document fragment.

An XML Validation Mapping Definition document 134 is defined as an XML-based document that is contained in memory 105, while the user interactive validation utility 112 is running, or saved in a data storage device 107, 109, 124, 126 file. The file preferably has an extension 'vld' and it may be stored, for later use, in a data storage device which may be in a remote server 120, of a network environment, that is connected to the client 100 computer where the GUI is running,. The fully qualified names of all available '.vld' files are preferably listed in an XML-based document which may be named 'ValidateFactories.xml'. The user can assign a unique, user-friendly name to each '.vld' file in the 'ValidateFactories.xml' document. When the user interactive validation utility 112 is started, in step 202, the 'ValidateFactories.xml' file is read automatically, and all specified '.vld' files are loaded into memory 105 to be displayed for user's selection.

Figures 5, 6:
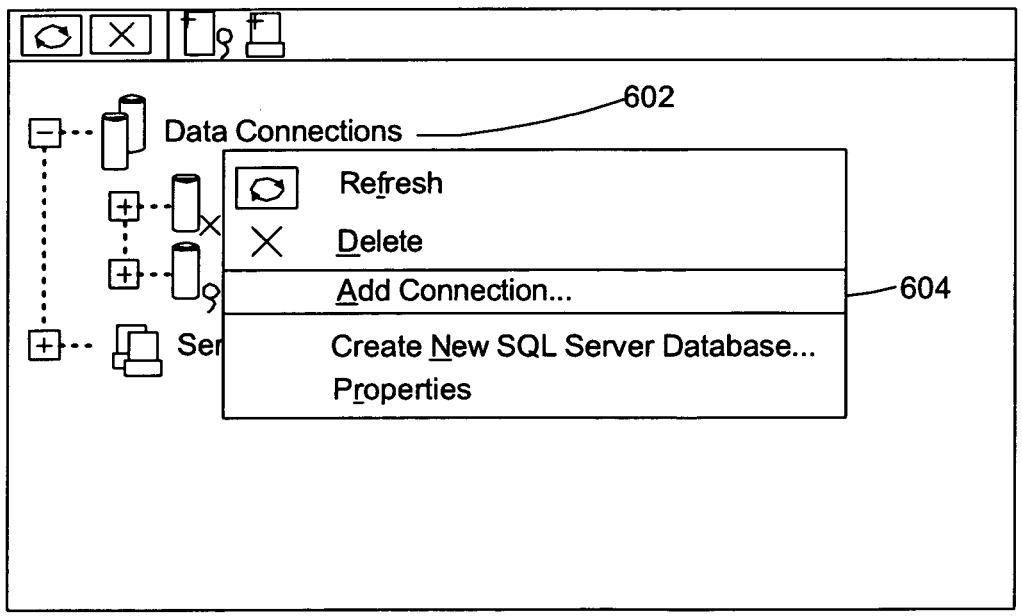
FIG. 5 illustrates the structure of an exemplary XML Validation Mapping Definition document code excerpt, according to the preferred embodiments of the present invention.
FIG. 6 illustrates how a target destination connection to a database table column is formed, according to the preferred table column validation embodiments of the present invention.

The structure of an XML Validation Mapping Definition document is illustrated in an exemplary XML excerpt shown in FIG. 5.

The validation code 136 generated by the present invention defines the manner in which data of an entire XML source document 132 or its fragments are validated, in step 214, against at least one XML validation schema 130, before inserting the validated XML data into a target destination in step 216. The target destination may be an input parameter of a stored procedure, function, at least one XML column of a target destination database or any other target destination.

The user interactive validation utility 112 of the present invention can be implemented in many ways. One such implementation of the preferred embodiments of the present invention is shown in FIGS. 6-13, and is used in the following examples to illustrate different modes of validation of XML data by the user interactive validation utility 112 of the present invention.

In the first example the user interactive validation utility 112 of the present invention is used for validating data of an XML source document during an update/insert operation on a target destination database column declared as XML format type. The environment is a banking e-commerce site for a global financial transaction tracking system where a large amount of XML data has to be loaded on a regular basis into a table with multiple XML columns. Thus, there is a need for reliable and efficient XML data validation. During XML source document data inserts and updates, an exemplary registered XML validation schema, named 'GlobalTransaction.xsd', is used for business and financial data validation. This validation example will prohibit applications to insert/update any transaction amount that is set to less than zero. A database table named 'transaction' has multiple XML columns and an ID column that acts as a primary key. The name of a target destination XML column is 'TransactionSummary'.

To initiate the automatic validation of selected XML data during their insert into or update of the XML column 'TransactionSummary', a user also needs to specify a registered XML validating schema or its namespace attribute during an insert/update storage operation. The present invention's GUI provides a visual interactive menu-driven tool which allows a user to point to a menu entry and select one of the options provided by the GUI for an XML source document, target destination and XML schema. According to the user's interaction with the present invention's GUI, the interactive validation utility 112 creates an XML Validation Mapping Definition document and a validation code, such as a SQL script. Generated SQL script is sent to the RDBMS to perform validation of the XML source document data, before storing them in the 'TransactionSummary' column, against the XML validation schema 'GlobalTransaction.xsd'. The validation process will reject insert/update operations where the transaction amount is set to less than zero.

Figure 7:
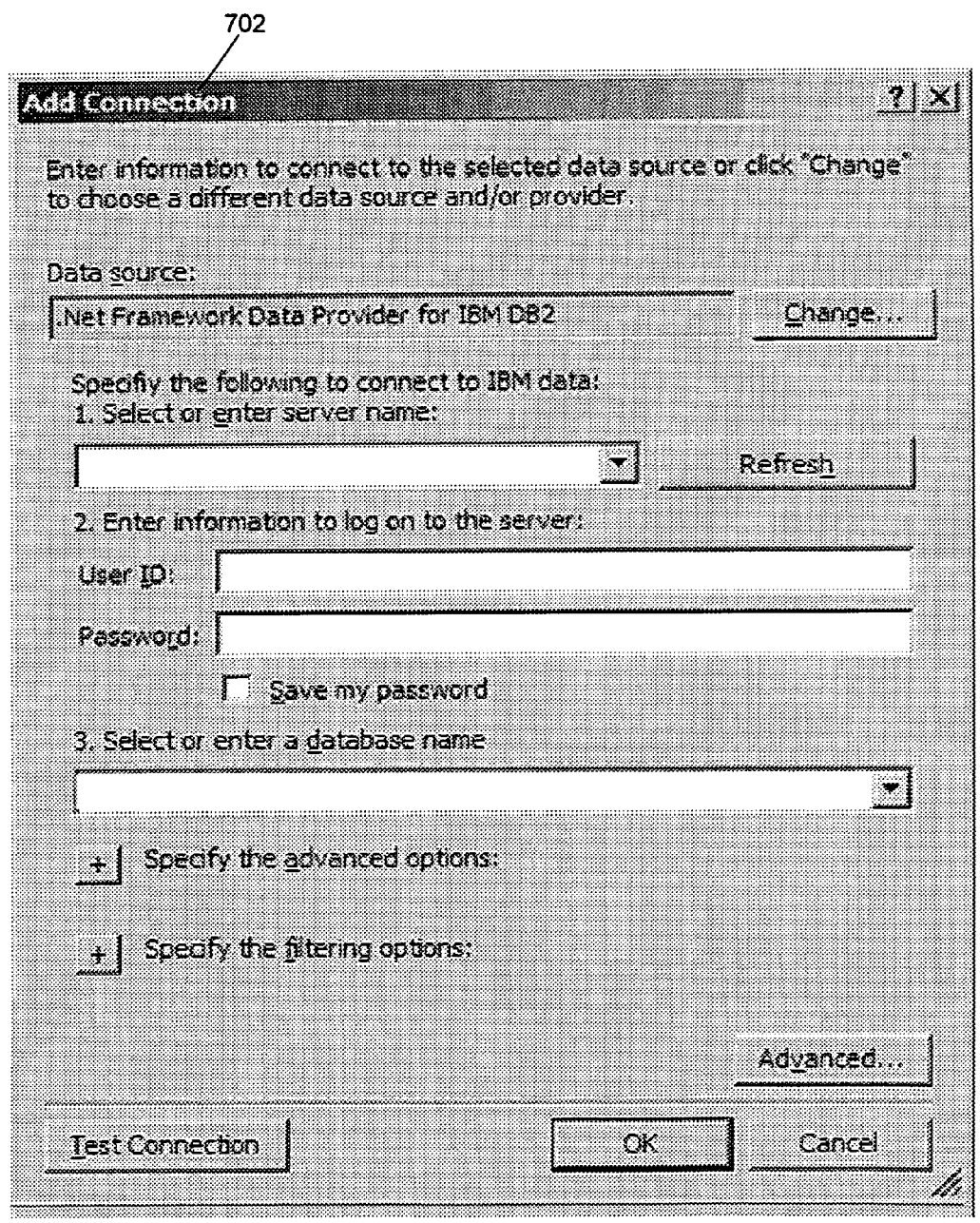
FIG. 7 illustrates the structure of an Add Connection dialog box, according to the preferred table column validation embodiments of the present invention.
Figure 8:
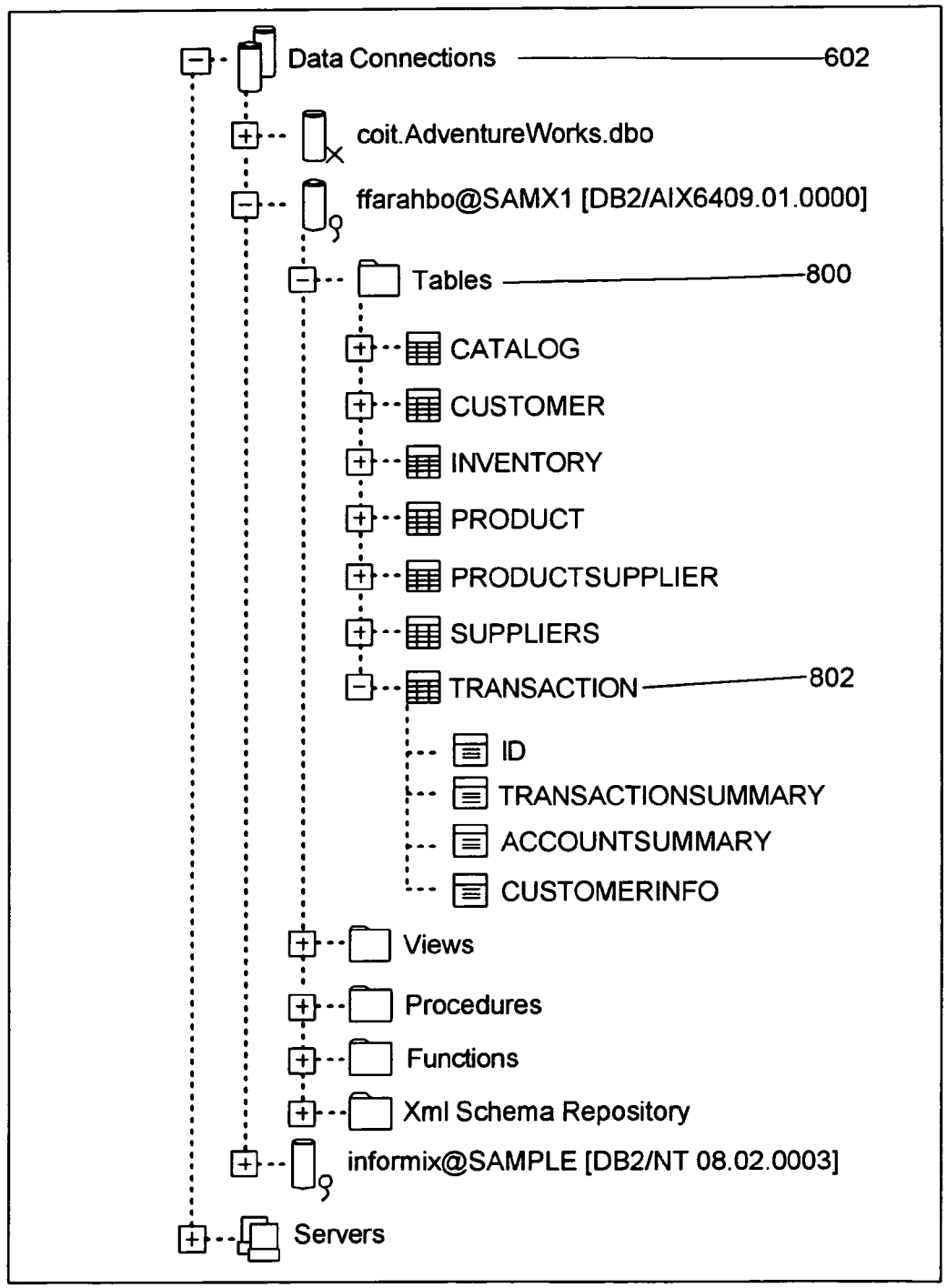
FIG. 8 illustrates how database objects are displayed in a tree under the connection, according to the preferred table column validation embodiments of the present invention.

FIGS. 6-13 illustrate the use of an exemplary GUI implementation of the interactive validation utility 112 of the present invention and show how the validation is performed according to the preferred validation embodiments of the present invention where a database table column is a target destination. FIGS. 6-8 illustrate how a connection to a target destination is formed. From the Tables folder 800 of FIG. 8 the user selects a table named 'transaction' 802 from a database Data Connections 602 object list and selects a Show Data menu entry 900 of FIG. 9 which opens the 'transaction' table data view window of FIG. 10. An ellipse button appears for each XML column 1002 and a click to an ellipse button displays a tool selection drop-down list 1004 for an XML format type column. The user selects an XML Designer tool 1006 from the list because this tool allows validation during insert/update of XML data into an XML column. XML Designer tool 1006 and its windows are implemented to facilitate interactive visual XML data mapping, validation and storage, according to the preferred embodiments of the present invention. XML Designer tool 1006 is also used as an editor of XML data from the XML source document, as described in the related patent application named "Automated Interactive Visual Mapping Utility For Transformation and Storage of XML Data", incorporated herein by reference.

Particularly, the user creates a target destination connection by right-clicking on the Data Connections node 602 of FIG. 6 and by selecting Add Connection entry 604 on the context menu. This action displays an Add Connection dialog box 702 of FIG. 7, used for specifying information for a data connection. The user enters the target destination connection information in the Add Connection dialog box 702, as requested in FIG. 7, and the user interactive validation utility 112 of the present invention automatically makes the connection.

After a connection to the target destination is made, all database objects, such as tables, views, stored procedures and functions, are displayed in a tree under the connection, as illustrated in FIG. 8, which shows the data connection object list with the Tables folder 800 expanded to allow user's selection of a table and its columns. For this example, the user selects the table named 'transaction' 802 from the data source connection object list and then selects a Show Data entry 900 from the menu of FIG. 9 to bring up the Data View window for the table named 'transaction', as shown in FIG. 10.

Figure 9:
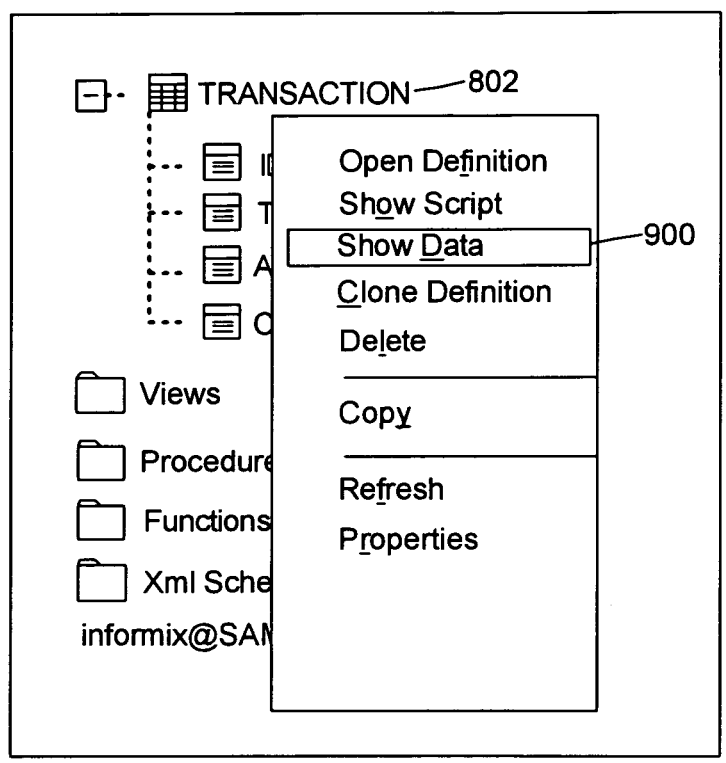
FIG. 9 illustrates a menu for selection of the Show Data entry, according to the preferred table column validation embodiments of the present invention.
Figure 10:
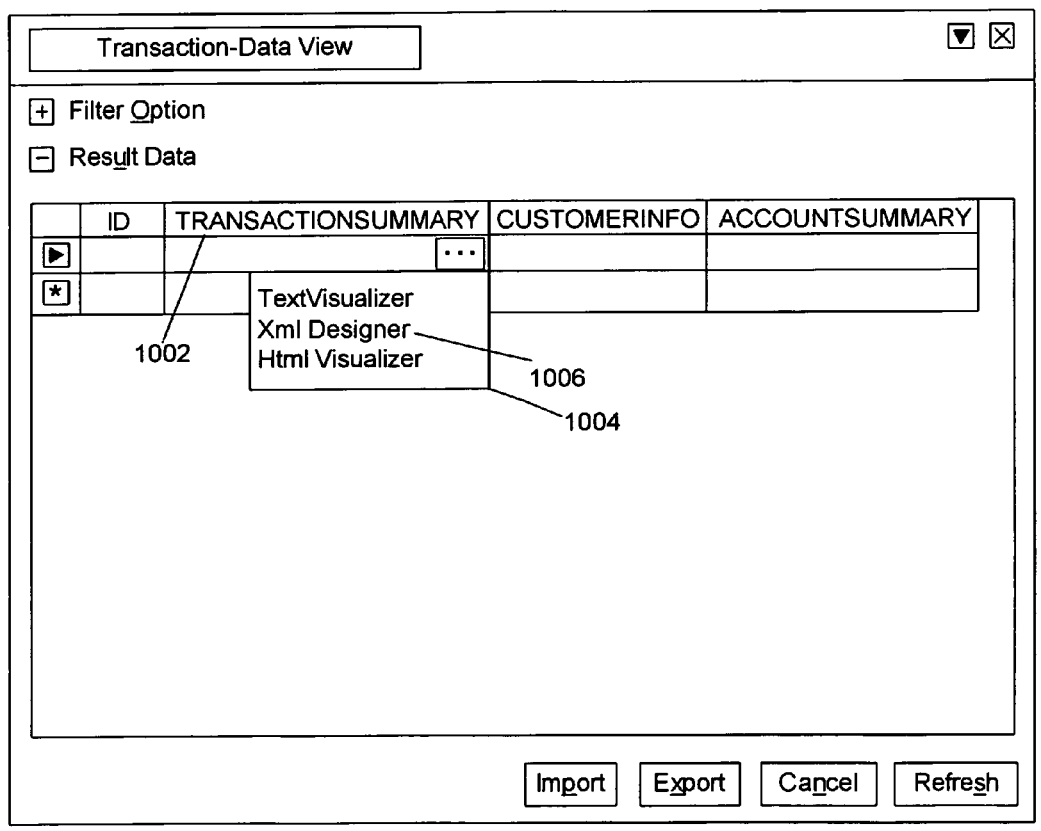
FIG. 10 illustrates a drop-down list for an XML data column, with the XML Designer tool selected, according to the preferred table column validation embodiments of the present invention.

Selection of the Show Data entry of FIG. 9 opens the Data View for the table 'transaction' to display all columns of the table 'transaction', as shown in FIG. 10. When the user clicks the ellipse in a cell of the XML column called 'TransactionSummary' 1002 it brings up a selection drop-down menu 1004 for the cell with items like XML Designer 1006, which the user selects from the list because it will allow validation. Selection of the XML Designer tool opens a new window, named XML Designer window, shown in FIG. 11.

FIG. 11 illustrates the XML Designer window which shows XML data 1102 section and a selection list of registered XML validation schemas 1104. The top panel of the XML Designer window of FIG. 11 shows the XML data of the XML source document in their native format, before they are validated and stored in the 'TransationSummary' 1002 column. A Validate Options section 1106 of the XML Designer window, shown in the bottom panel of FIG. 11, shows a list of all registered XML validation schemas, available in the repository, for user's selection.

The user selects one or more XML validation schemas from the grid of the Validate Options section 1106, such as 'GlobalTransaction.xsd' schema 1108, along with its Location attribute 1110 that shows where the XML validation schema is located. During the insert/update operation, the selected XML validation schema(s) will be used for validation of the XML data 1102 section content to be stored in the 'TransactionSummary' 1002 column. After the user's interaction with the present invention's GUI to select appropriate XML data, XML columns and schemas, the user interactive validation utility of the present invention automatically creates an XML Validation Mapping Definition document. When the user tries to update or insert XML data from the XML source document, a validation code, such as a SQL script, is generated to perform validation of this XML source document against the XML validation schema 'GlobalTransaction.xsd' 1108. In this example, as requested, the validation process does not perform an insert/update operation if the transaction amount is set to less than zero.

Following exemplary validation code is automatically generated for an update operation of this example as a SQL script with the following SQL statement.

Update TRANSACTION set TransactionSummary=XMLVALIDATE2(X ACCORDING TO XMLSCHEMA ID 'SALES.GlobalTransaction.xsd') where ID=?;

Following exemplary validation code is automatically generated for an insert operation of this example as a SQL script with the following SQL statement.

Insert into TRANSACTION (ID, TransactionSummary) values (?, XMLVALIDATE2(X ACCORDING TO XMLSCHEMA ID 'SALES.GlobalTransaction.xsd'))

In the second example the user interactive validation utility of the present invention is used for validating data of an XML source document against an XML validation schema defined by its namespace, during an update/insert operation on a column declared as XML format type. The process of selecting a table and its XML type column and showing it in the XML Designer window is the same as in the first example, shown above in reference to FIGS. 6-11.

Figure 12:
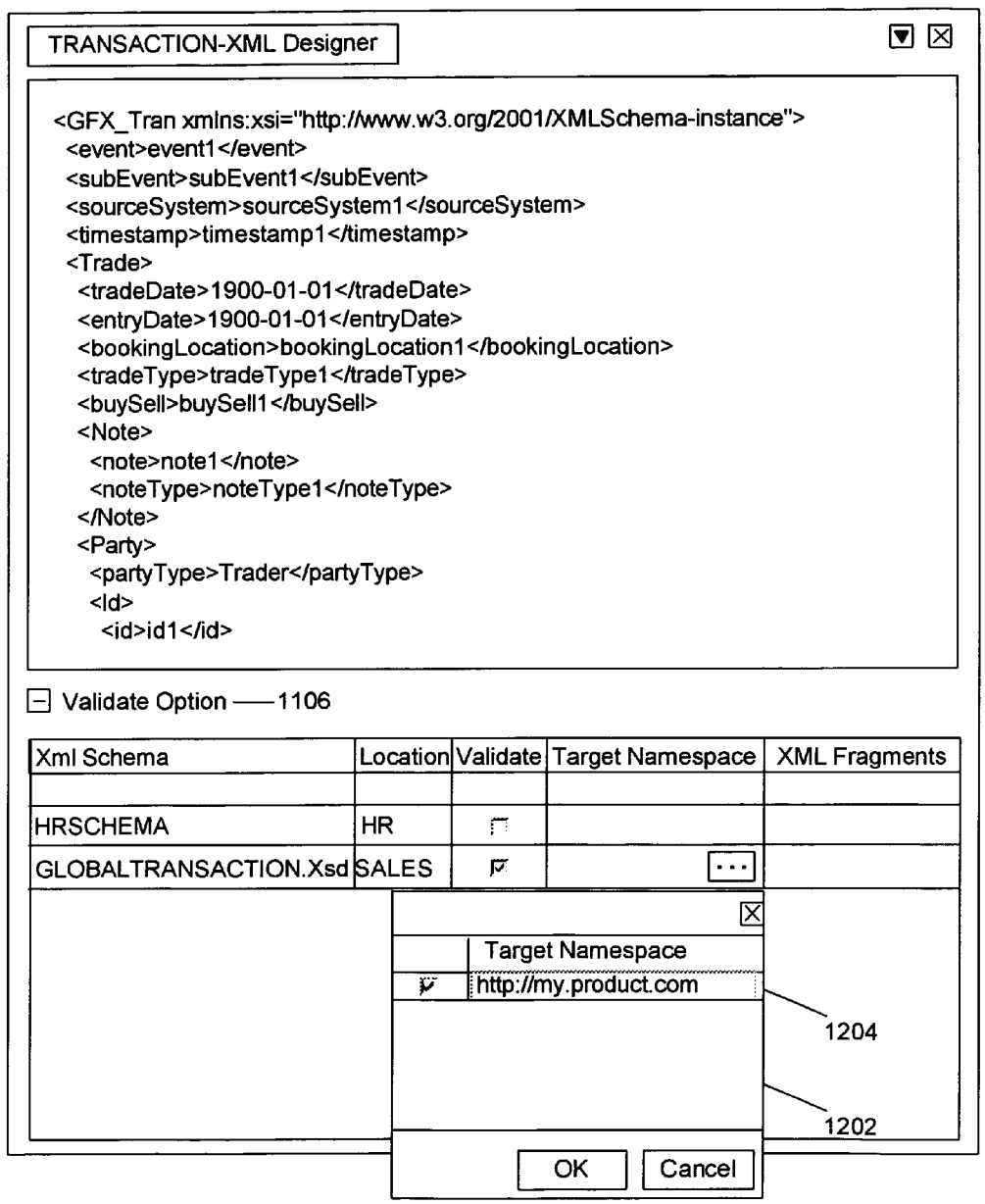
FIG. 12 illustrates an XML Designer window with a namespace drop-down list, according to the preferred table column validation embodiments of the present invention.

FIG. 12 of the second example shows how a user can select a specific registered XML validation schema and its namespace from a namespace drop-down list 1202, displayed in the XML Designer window. The user selects the XML validation schema 'GlobalTransaction.xsd' namespace, which is 'http://my.product.com' 1204, as defined in the XML validation schema 'GlobalTransaction.xsd'. The user's interaction with the present invention's GUI creates an XML Validation Mapping Definition document. When the user tries to update or insert XML data from the XML source document a SQL script is generated to perform validation of this XML source document against the XML validation schema 'GlobalTransaction.xsd', defined by the 'http://my.product.com' namespace. In this example the validation code rejects each insert/update operation that has a transaction amount set to less than zero.

Following exemplary validation code is automatically generated for an update operation of this example as a SQL script with the following SQL statement.

Update TRANSACTION set TransactionSummary=XMLVALIDATE2(X ACCORDING TO XMLSCHEMA URI 'http://my.product.com') where ID=?;

Following exemplary validation code is automatically generated for an insert operation of this example as a SQL script with the following SQL statement.

Insert into TRANSACTION (ID,TransactionSummary) values (?, XMLVALIDATE2(X ACCORDING TO XMLSCHEMA URI 'http://my.product.com'))

In the third example the present invention is used for validating two fragments of the XML source document against the XML validation schema namespaces, during an update/insert operation on a database column declared as XML format type. The process of selecting a table and XML columns and the display in the XML Designer window is the same as in previous is examples, shown above in reference to FIGS. 6-11. However, in this example the user defines a finer mode of validation, validation in an XML fragment mode, and only the selected fragment will be validated. With the present invention's GUI, the user can draw a box around each XML source document fragment and does not have to know where the XML fragment starts and ends because the mapping is performed via XPath. The user interactive validation utility of the present invention automatically calculates the XML fragment's end tag, draws an XML fragment block and creates an XPath and a default label for the XML fragment. The user can modify the XML fragment label at any time. For each fragment an XPath is created dynamically.

Figure 13:
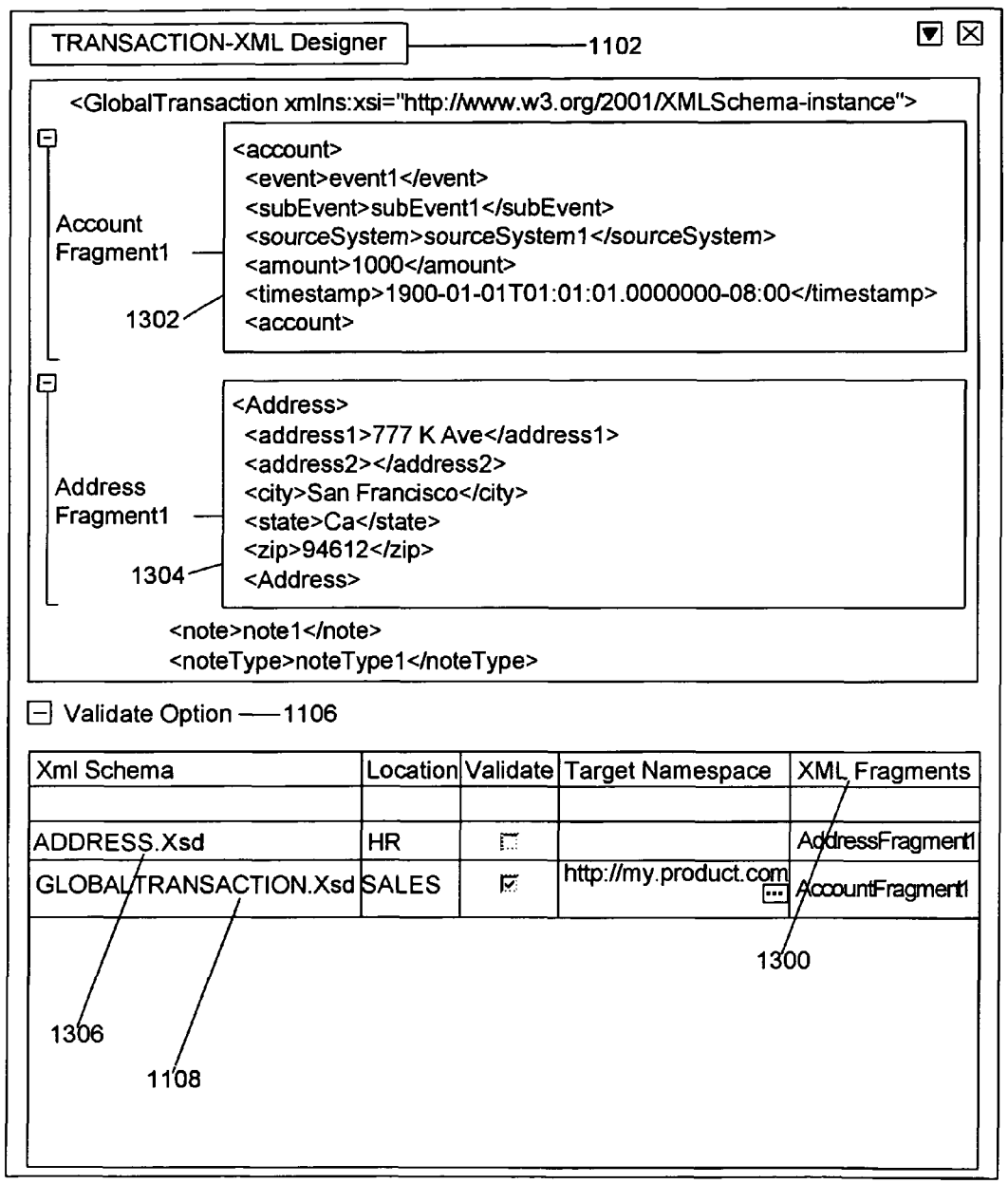
FIG. 13 illustrates an XML Designer window with XML Fragments column, according to the preferred table column validation embodiments of the present invention.

The user selects the fragments' labels, as shown in FIG. 13, from the XML Fragments column 1300 of the validation grid of the Validate Options section 1106, located at the bottom panel of the XML Designer window. FIG. 13 illustrates two fragments, AccountFragment1 1302 and AddressFragment1 1304, that have been selected by the user from the XML Fragments drop-down list. The XML validation schema 'GlobalTransaction.xsd' is selected for validation of AccountFragment1 by its namespace, defined as 'http://my.product.com'. XML fragment AddressFragment1 is validated against an XML validation schema named 'Address.xsd' 1306. User's interaction with the present invention's GUI creates an XML Validation Mapping Definition document. When the user tries to update or insert XML data fragments 1302 and 1304 a SQL script is generated to perform validation of these XML source document fragments.

FIG. 13 illustrates contents of XML fragments AddressFragment1 1304 and AccountFragment1 1302 from the validation grid, selected by the user. In this example two update and two insert operations, on two XML fragments, are generated against the same table and XML column. Since there are multiple XML fragments selected, each XML fragment requires a separate update and insert operation.

Next, the user interactive validation utility of the present invention automatically generates a validation code as SQL scripts shown below, created for validation of update and insert operations of fragments X and X2, selected with the GUI, where X is an XML source document fragment identified by AccountFragment1 and X2 is an XML source document fragment identified by AddressFragment1.

Following exemplary validation code is automatically generated for an update operation of this example as a SQL script with the following SQL statements.

Update TRANSACTION set TransactionSummary=XMLVALIDATE2(X ACCORDING TO XMLSCHEMA URI 'http://my.product.com') where ID=?;

Update TRANSACTION set TransactionSummary=XMLVALIDATE2(X2 ACCORDING TO XMLSCHEMA ID Address.xsd) where ID=?;

Following exemplary validation code is automatically generated for an insert operation of this example as a SQL script with the following SQL statements.

Insert into TRANSACTION (ID, TransactionSummary) values (?, XMLVALIDATE2(X ACCORDING TO XMLSCHEMA URI 'http://my.product.com')

Insert into TRANSACTION (ID, TransactionSummary) values (?, XMLVALIDATE2(X2 ACCORDING TO XMLSCHEMA ID Address.xsd)

In the present invention the XML columns of the target destination may belong to the same or different database tables residing in one or more databases of a heterogeneous RDBMS environment, possibly with physically distributed and disparate DBMSes residing on different hardware systems and possibly storing data in different formats. The target destination of the validated XML data may also be a web service call, a standalone application call, a stored procedure's input or input/output parameter of XML type, etc.

Figure 14:
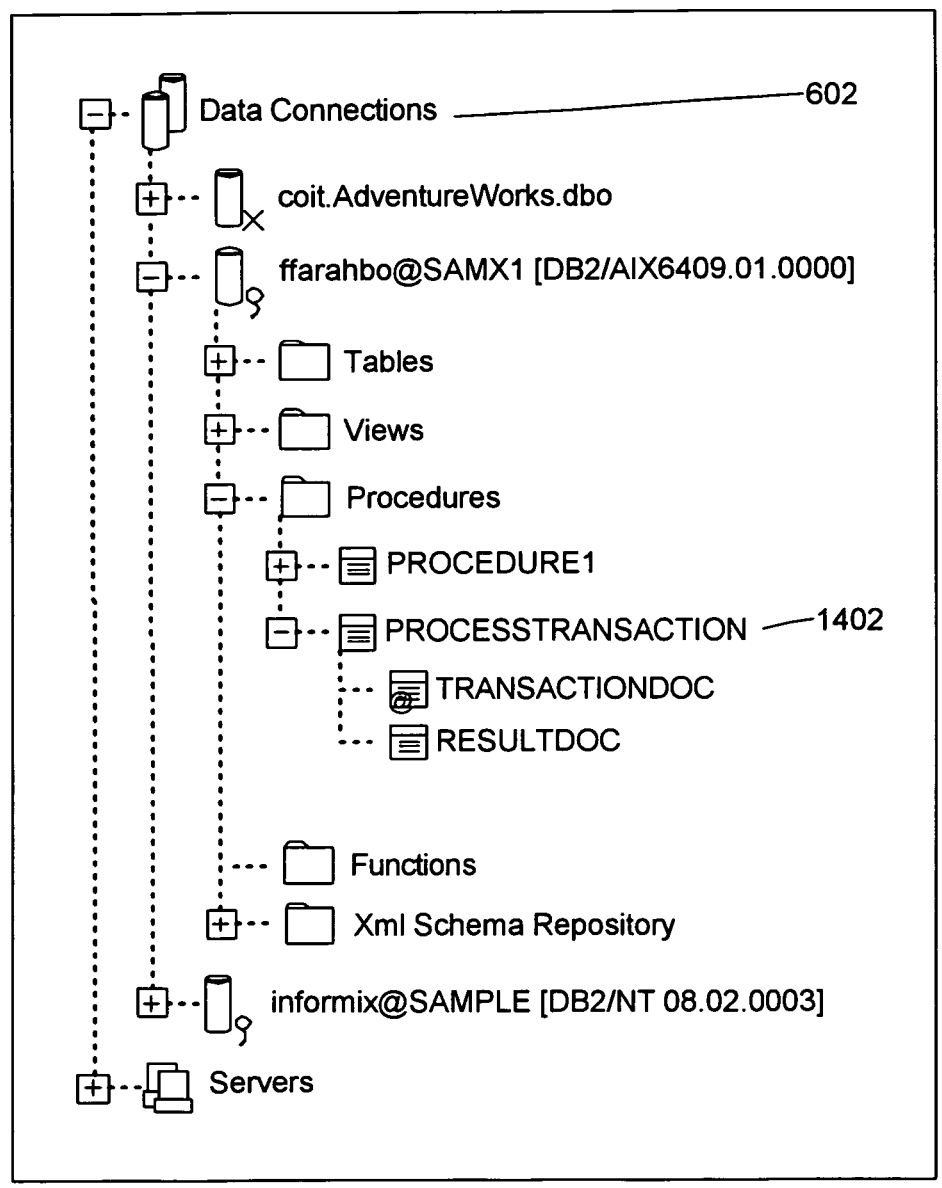
FIGS. 14-20 correspond to FIGS. 6-13 but here the target destination is a stored procedure's input parameter, according to the preferred stored procedure validation embodiments of the present invention.
Figure 15:
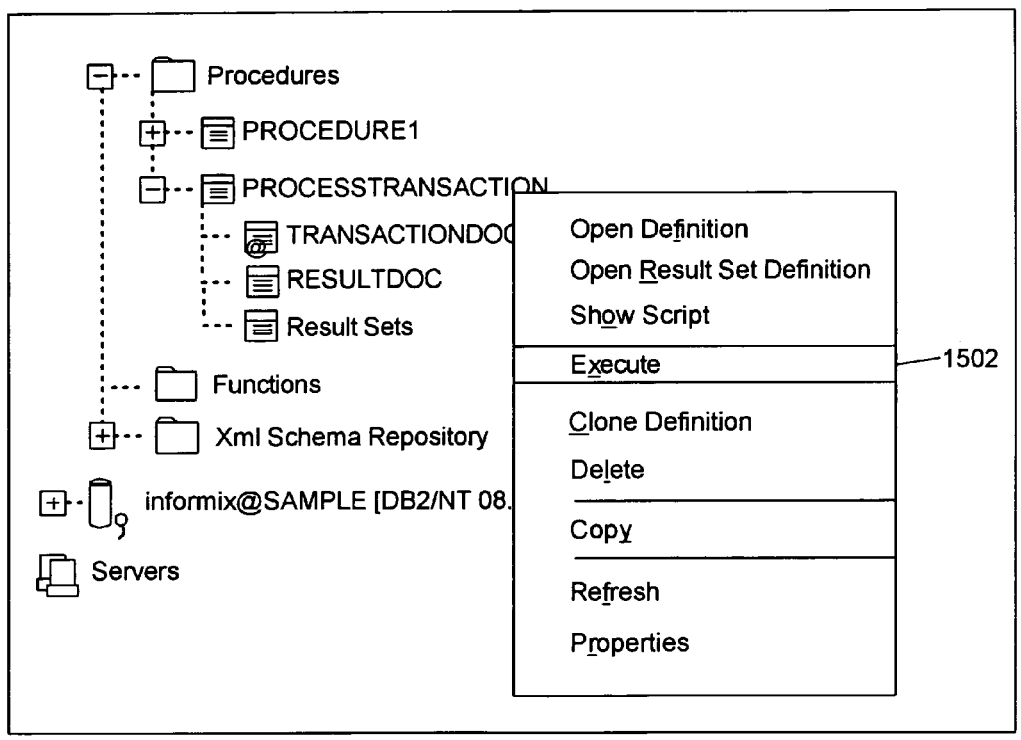

FIGS. 14-20 illustrate two examples for validating a stored procedure's input parameter. FIGS. 14-20 correspond to FIGS. 6-13 but here the target destination is a stored procedure's input parameter, according to the preferred stored procedure validation embodiments of the present invention. FIG. 14 illustrates mapping of XML data into an input or input/output parameter of a stored procedure, where the validation of the parameter will be performed when the procedure is called for execution. This example is also applicable to an input parameter of a function.

Figure 16:
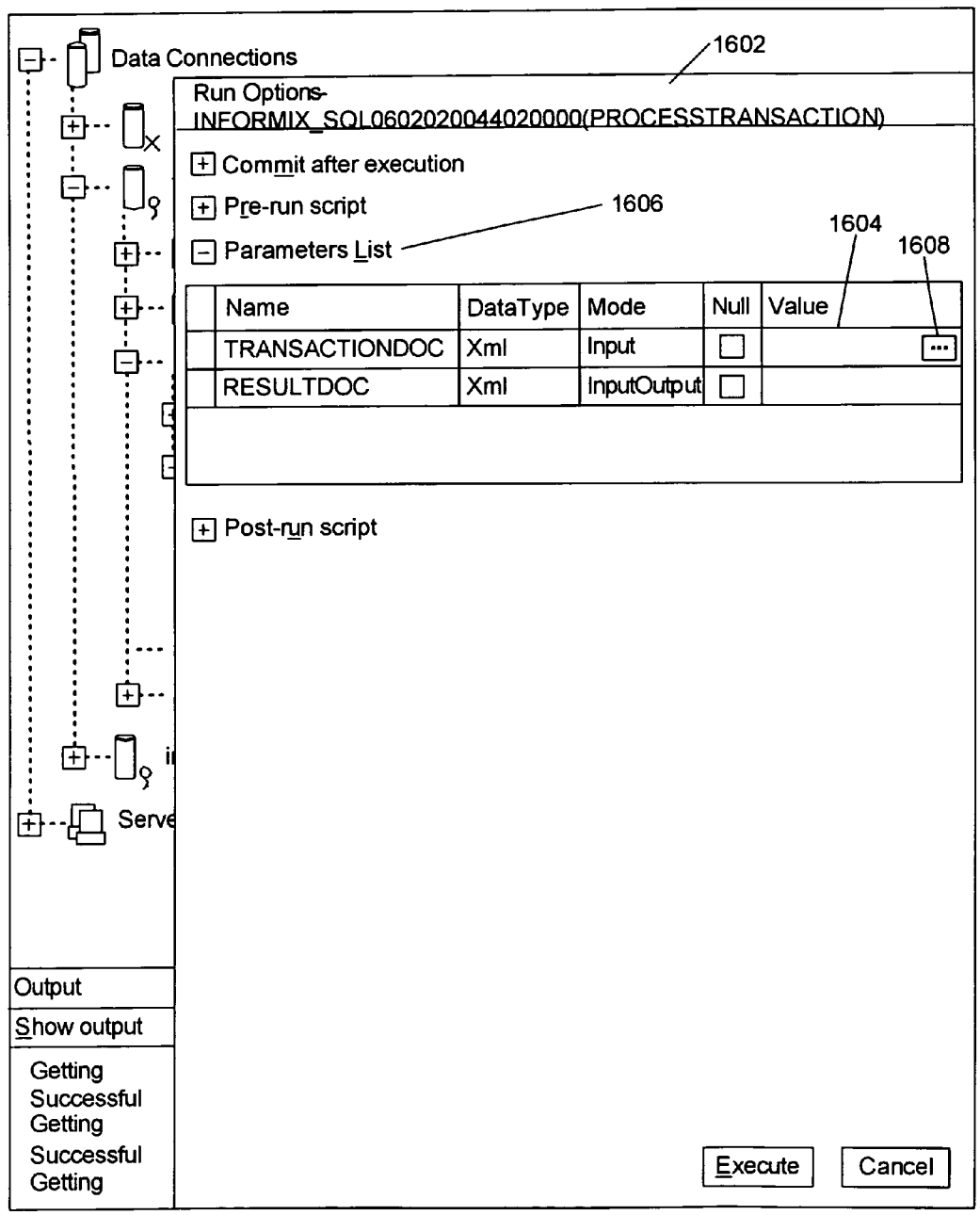

In the fourth example the present invention is not used for validating a table type object but for validating an input or input/output parameter of a stored procedure, declared as XML format type, against an XML validation schema, performed during execution of the stored procedure. The user selects a stored procedure PROCESSTRANSACTION 1402 from the Data Connections 602 object list, as shown in FIG. 14. This stored procedure has two parameters, TRANSACTIONDOC and RESULTDOC, and TRANSACTIONDOC parameter is an input parameter of XML format type to be validated when a user selects the PROCESSTRANSACTION procedure and selects Execute 1502 from the context menu of FIG. 15. Once the Execute 1502 selection is made, a Run Option dialog box 1602 pops up allowing the user to enter values for input parameters in a Value column 1604 of a Parameter List grid 1606, as shown in FIG. 16.

Figure 17:
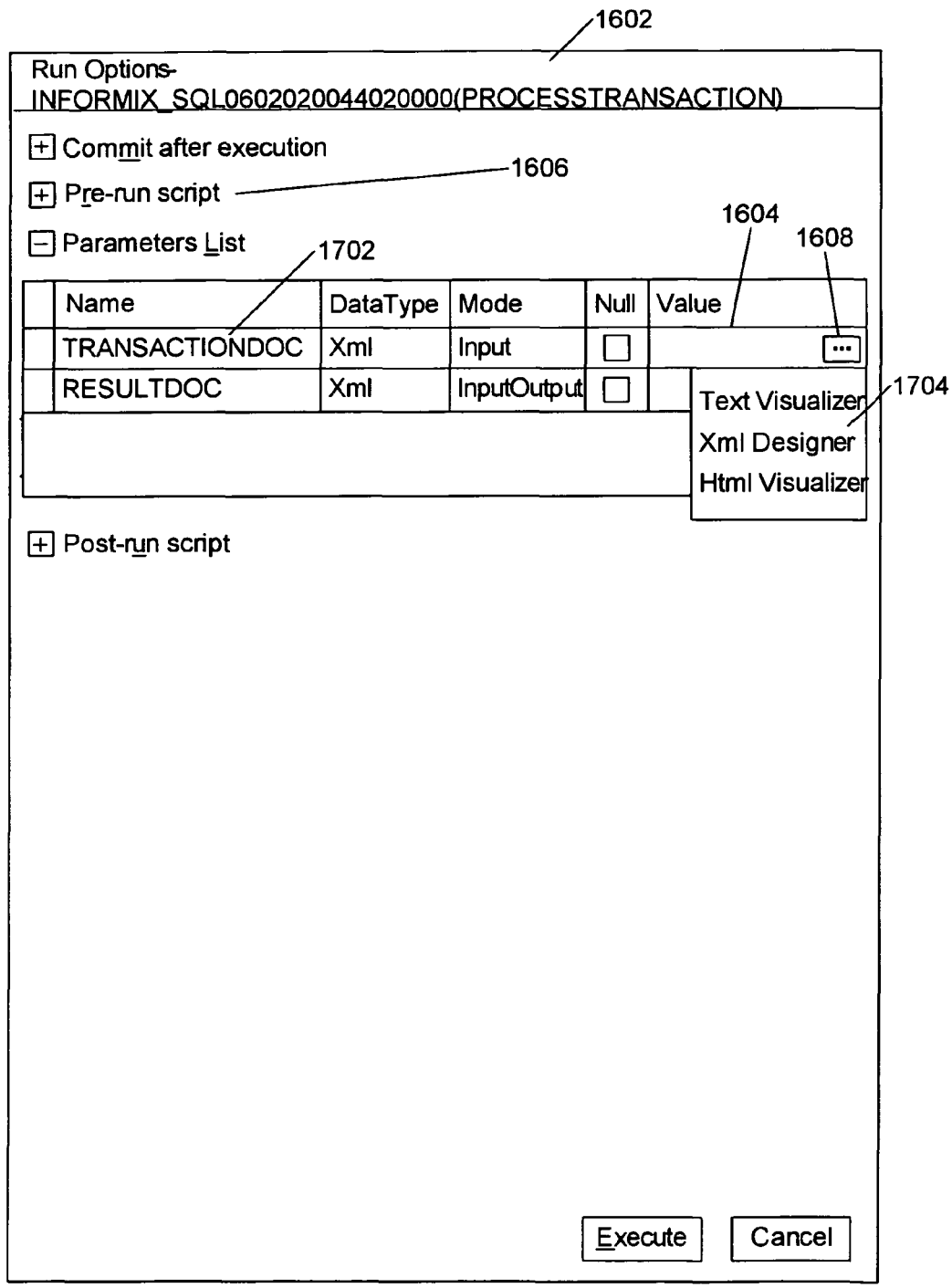
Figure 18:
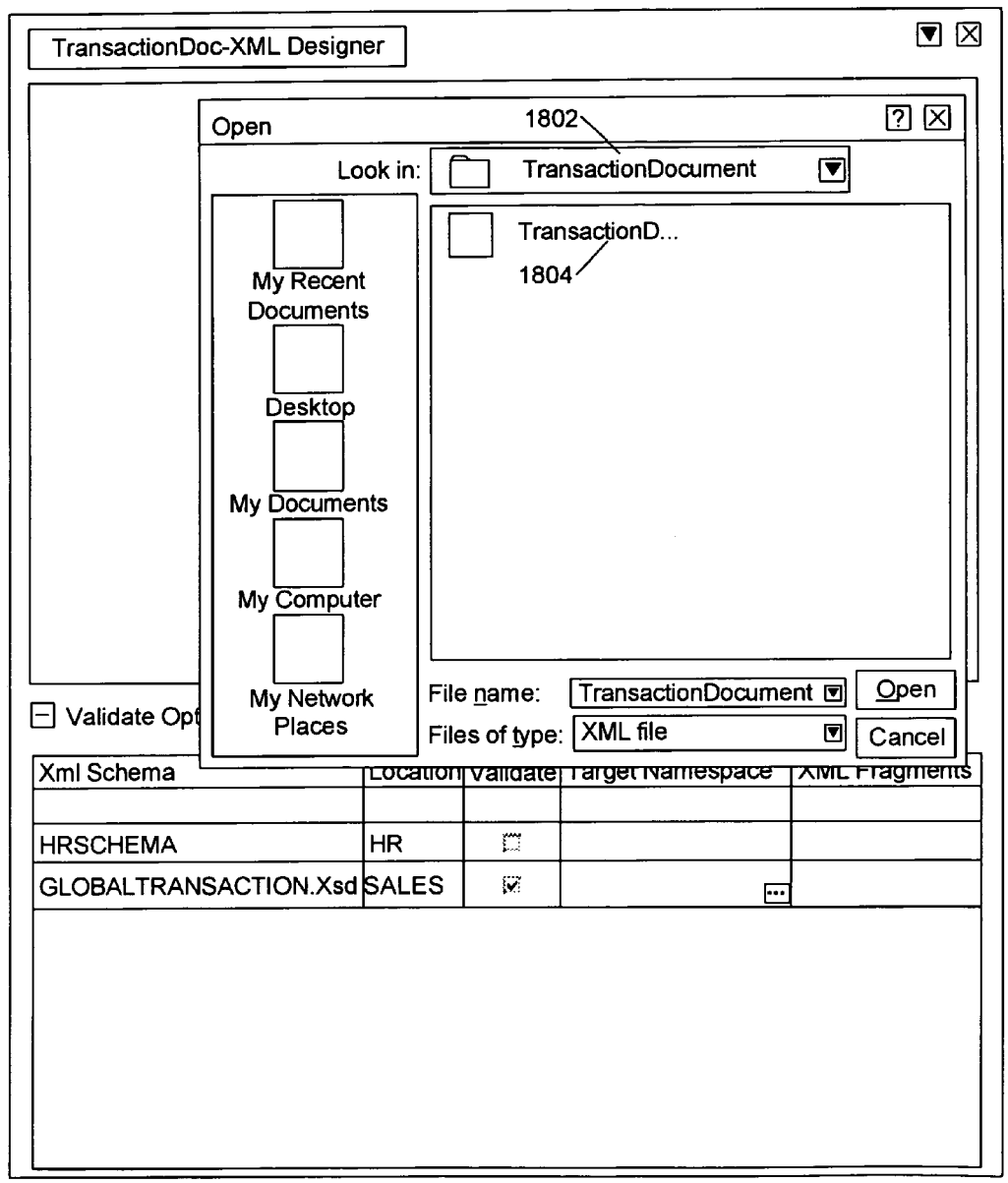

An ellipse button 1608 appears for each XML format type parameter object in the Value column 1604. When the user clicks on it in the Value column of TRANSACTIONDOC parameter 1702, a drop-down list for this column presents the XML Designer 1704, which the user selects to perform mapping and validation, as shown in FIG. 17. After the user selects the XML Designer 1704 from the drop-down list, the XML Designer 1704 opens a system file TransactionDocument directory 1802, as shown in FIG. 18. This allows the user to select an XML data source document 1804 file from TransactionDocument directory 1802 to be validated before reaching the target destination which is the selected input parameter of the stored procedure, as shown in FIG. 18.

Figure 19:
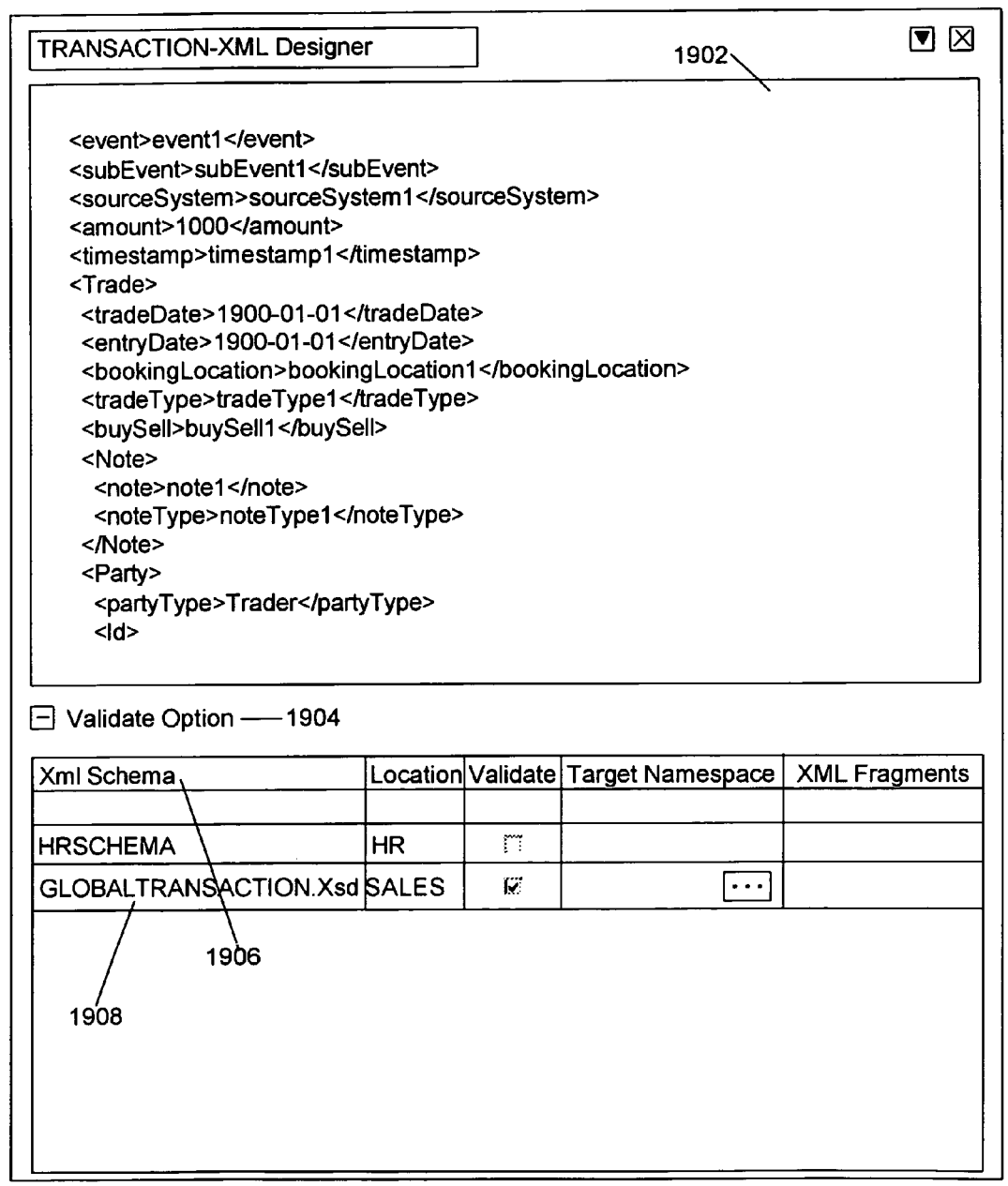

Once the XML data source document 1804 is selected from the system file directory 1802, the top panel 1902 of the XML Designer 1704 window shows the selected XML document in its native format, as shown in FIG. 19. The bottom panel of the XML Designer, named a Validate Options 1904 section, presents a list of all XML schemas 1906 available in the repository. User selects an XML schema named 'GlobalTransaction.xsd'. The user's interactions with the invention's GUI tool create an XML Validation Mapping Definition document. When the user tries to execute the selected stored procedure, a validation code is generated to validate the selected XML data, assigned to the input parameter, against the selected XML schema 'GlobalTransaction. xsd'.

Following exemplary validation code is automatically generated for an execute stored procedure call operation of this example as a SQL script with the following SQL statement.

Call PROCESSTRANSACTION (XMLVALIDATE2(X ACCORDING TO XMLSCHEMA ID 'SALES.GlobalTransaction.xsd'), null)

In the fifth example the present invention is used for validating two fragments of the XML source document against the XML validation schema namespaces, during execution of a stored procedure. An input or input/output parameter of a stored procedure, declared as XML format type, is dynamically mapped against multiple XML fragments from an XML source document and is validated against an XML validation schema during the execution of the stored procedure. Since there are two XML fragments, each XML fragment requires a separate call stored procedure statement.

The process of selecting an XML input parameter in the XML Designer 1704 window is the same as in the previous example, shown above in reference to FIGS. 14-19. However, in this example the user defines a finer mode of validation, validation in an XML fragment mode, and only the selected fragment will be validated. With the present invention's GUI tool, the user can draw a box around each XML source document fragment, as explained in the third example, and does not have to know where the XML fragment starts and ends because the mapping is performed via XPath. The user interactive validation utility of the present invention automatically calculates the XML fragment's end tag, draws an XML fragment block and creates an XPath and a default label for the XML fragment. The user can modify the XML fragment label at any time. For each fragment an XPath is created dynamically.

Figure 20:
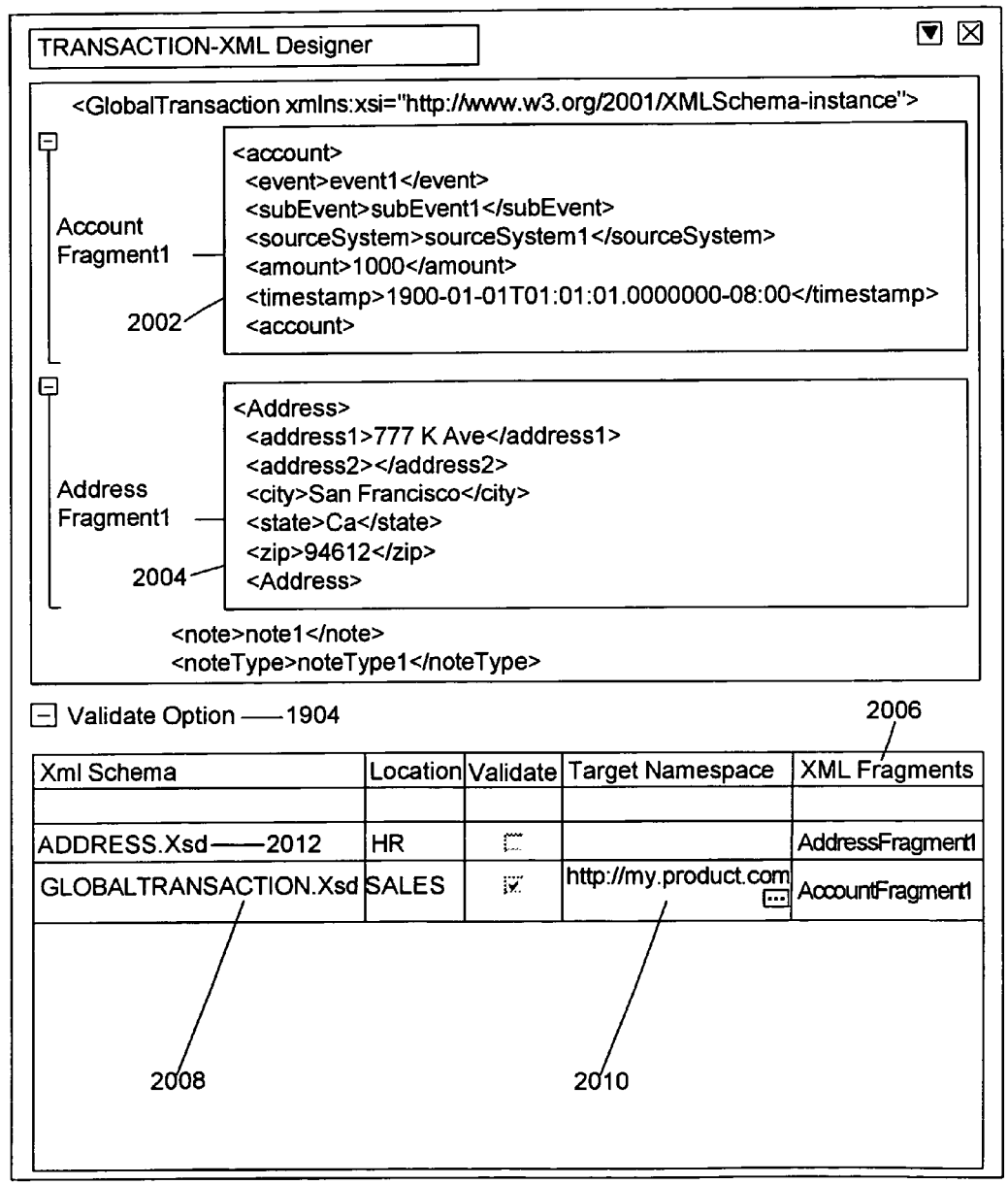

The user selects the fragments' labels from the XML Fragments column 2006, shown in FIG. 20, of the validation grid of the Validate Options section 1904, located at the bottom panel of the XML Designer window. FIG. 20 illustrates contents of two fragments, AccountFragment1 2002 and AddressFragment1 2004, that have been selected by the user from the XML Fragments drop-down list. The XML validation schema 'GlobalTransaction.xsd' 2008 is selected for validation of AccountFragment1 by its namespace, defined as 'http://my.product.com'. XML fragment Address-Fragment1 is validated against an XML validation schema named 'Address.xsd' 2012. User's interaction with the present invention's GUI creates an XML Validation Mapping Definition document. When the user tries to execute the stored procedure a SQL script is generated to perform validation of these XML source document fragments. In this example two call statements are generated against the same stored procedure. Since there are two XML fragments each XML fragment requires a separate call statement.

Next, the user interactive validation utility of the present invention automatically generates a validation code as a SQL script shown below, created for validation of the selected input parameter's fragments X and X2, selected with the GUI, where X is an XML source document fragment identified by AccountFragment1 and X2 is an XML source document fragment identified by AddressFragment1.

Following exemplary validation code is automatically generated for an execute stored procedure call operation of this example as a SQL script with the following SQL statements.

Call PROCESSTRANSACTION (XMLVALIDATE2(X ACCORDING TO XMLSCHEMA URI 'http://my.product.com') ,null)
    Call PROCESSTRANSACTION (XMLVALIDATE2(X2 ACCORDING TO XMLSCHEMA ID Address.xsd) ,null)

As shown above, the present invention allows the user to visually select and to dynamically map a target destination, entire XML documents or their fragments, and XML validation schemas, and to automatically validate and store the XML data without creating or changing any program code or writing any database commands or code-based applications. Thus, the user can concentrate on the XML source document content rather than on the validation procedure. Because the complex manipulation of XML documents and schemas is removed from the user, with the help of the user interactive validation utility of the present invention, the validation process is much easier and accessible to a larger group of users than the conventional tools. With the user interactive validation utility of the present invention the validation process itself is hidden from the users and does not require any human intervention, thus eliminating errors. As an XML document or schema evolves, there is no need to change code or logic because the mapping definitions and validation code are created automatically and stored for future use. Moreover, because the use of the user interactive validation utility GUI is self-explanatory, no learning is required for novice users and the users do not have to be savvy and know how to write code and validation rules' syntax.

The user interactive validation utility of the present invention can be used by application developers but is especially beneficial as a human interface tool for data administrators for I/O entry of XML data. The preferred embodiments of the present invention have been implemented in the DB2® for z/OS® V9, in the DB2® MS Visual Studio NET® Extender. They are usable in repository systems that may contain one or more relational database systems and are especially applicable for networks and distributed database systems.

The foregoing description of the preferred embodiments of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatic validation of Extensible Markup Language (XML) data through interactive visual mapping comprising:

a user interacting with a graphic user interface (GUI) to validate a plurality of XML document fragments before storing validated XML data corresponding with the plurality of XML document fragments during an update or insert operation into any of a plurality of target destinations, wherein the plurality of target destinations comprise at least a plurality of XML columns of a plurality of database tables residing in a plurality of databases of a heterogeneous relational database management system, wherein user interactions are performed on a client, wherein the GUI is configured to allow the user to select any of the plurality of XML document fragments and any of the plurality of target destinations, wherein the XML document fragments comprise a plurality of lines of XML code, wherein the XML document fragment is selected by drawing a box around the plurality of lines of XML code, wherein the GUI automatically calculates an end tag and XPath of the selected XML document fragment, wherein the GUI concurrently displays the selected XML document fragment with validation information corresponding with the selected XML document fragment and the selected target destination, wherein the selected target destination is a data store, wherein the selected target destination is not previously connected with the selected XML document fragment, wherein the validated XML data includes a database object declared as XML format type, wherein the GUI is further configured to obtain a mapping of the selected XML document fragment and the selected target destination through at least one XML validation schema selected by the user, the at least one XML validation schema registered with the target destination, and to perform automatic XML data validations of the selected XML document fragment, and wherein the user interactions with the GUI automatically generate a user generated XML validation mapping definition document, the XML mapping definition document containing a user's validation mapping specifications and a validation code for commanding the automatic XML data validations, such that the selected XML document fragment is mapped to the selected target destination.

2. The method according to claim 1, wherein the XML validation schema is represented with its namespace.

3. The method according to claim 1, wherein the GUI is menu-driven.

4. The method according to claim 3, wherein the GUI displays a window with the XML data in native format and a selection of the XML validation schemas.

5. The method according to claim 1, wherein the generated XML validation mapping definition document comprises a programming language of the validation code, a type and name of the XML document fragment and locations of the one or more user selected target destinations and the XML validation schema.

6. The method according to claim 5, wherein the validation code programming language is selected from the group consisting of a Structured Query Language (SQL) script, C# code, Java code, Virtual Basic code, Hypertext Preprocessor code, and C++ code.

7. The method according to claim 1, wherein:
the validated XML data is stored in the one or more user selected target destinations selected from the group consisting of an XML column of a database table, a web service call, a standalone application call, a function's input parameter of XML type, a stored procedure's input or input/output parameter of XML type, and a heterogeneous Relational Database Management System (RDBMS) environment.

8. A system of computer hardware that uses a computer hardware enabled network for automatic validation of Extensible Markup Language (XML) data through interactive visual mapping-comprising:
a processor;
a user interactive validation utility having a graphic user interface (GU) the user interactive validation utility configured to validate a plurality of XML document fragments before storing validated XML data stored in the plurality of XML document fragments during an update or insert operation into one or more user selected target destinations, wherein
the plurality of target destinations comprise at least a plurality of XML columns of a plurality of database tables residing in a plurality of databases of a heterogeneous relational database management system, wherein
the user interactive validation utility resides on a client, wherein
user interactions are performed on the client, wherein
the GUI is configured to allow the user to select any of the plurality of XML document fragments and the one or more user selected target destinations, wherein
the XML document fragments comprise a plurality of lines of XML code, wherein
the XML document fragment is selected by drawing a box around the plurality of lines of XML code, wherein
the GUI automatically calculates an end tag and XPath of the selected XML document fragment, wherein
the GUI concurrently displays the selected XML document fragment with validation information corresponding with the selected XML document fragment and the selected target destination, wherein the one or more user selected target destinations are data stores, wherein
the target destination is not previously connected with the selected XML document fragment, wherein
the validated XML data includes a database object declared as XML format type, wherein
the GUI is further configured to obtain a mapping the selected XML document fragment and the one or more user selected target destinations through at least one XML validation schema, selected by the user, the at least one XML validation schema registered with the one or more user selected target destinations, and to perform automatic XML data validations of the selected XML document fragment such that the selected XML document fragment is mapped to each of the one or more user selected target destinations, wherein
the user interactions with the GUI automatically generate a user generated XML validation mapping definition document, the XML mapping definition document containing a user's validation mapping specifications, and a validation code for commanding the automatic XML data validations such that the selected XML document fragment is mapped to the selected target destination.

9. The system according to claim 8, wherein the XML validation schema is represented with its namespace.

10. The system according to claim 8, wherein the GUI is menu-driven.

11. The system according to claim 10, wherein the GUI displays a window with the XML data in native format and a selection of the XML validation schemas.

12. The system according to claim 8, wherein the generated XML validation mapping definition document comprises a programming language of the validation code, a type and name of the XML document fragment and locations of the one or more user selected target destinations and the XML validation schema.

13. The system according to claim 12, wherein the validation code programming language is selected from the group consisting of a Structured Query Language (SQL) script, C# code, Java code, Virtual Basic code, Hypertext Preprocessor code, and C++ code.

14. The system according to claim 8, wherein:
the validated XML data is stored in the one or more user selected target destinations selected from the group consisting of an XML column of a database table, a web service call, a standalone application call, a function's input parameter of XML type, a stored procedure's input or input/output parameter of XML type, and a heterogeneous Relational Database Management System (RDBMS) environment.

15. A computer program product for automatic validation of Extensible Markup Language (XML) data through interactive visual mapping using a computer, the computer program product comprising:
a non-transitory tangible computer usable medium tangibly storing programmatic instructions, wherein the programmatic instructions comprise:
first programmatic instructions for obtaining a mapping of a plurality of XML document fragments and one or more user selected target destinations through at least one XML validation schema selected by a user and to perform automatic XML data validations of the plurality of XML document fragments during an update or insert operation into any of a plurality of target destinations, wherein the one or more user selected target destinations comprise at least a plurality of XML columns of a plurality of database tabes residing in a plurality of databases of a heterogeneous relational database management system, wherein the target destination is not previously connected with the selected XML document fragment, wherein the validated XML data includes a database object declared as XML format type, wherein the at least one XML validation schema is registered with the one or more user selected target destinations, according to a user's interactions with a graphic user interface (GUI) before storing validated XML data to the one or more user selected target destinations, wherein user interactions with the GUI are performed on a client, wherein the XML document fragments comprise a plurality of lines of XML code, wherein the XML document fragment is selected by drawing a box around the plurality of lines of XML code, wherein the GUI automatically calculates an end tag and XPath of the selected XML document fragment, wherein the GUI concurrently displays the selected XML document fragment with validation information corresponding with the selected XML document fragment and the selected target destination, and wherein the user interactions with the GUI automatically generates a user generated XML validation mapping definition document, the XML mapping definition document containing a user's validation mapping specifications, and a validation code for commanding the automatic XML data validations such that the selected XML documents fragment is mapped to each of the one or more user selected target destinations.

16. The computer program product according to claim 15, wherein the XML validation schema is represented with its namespace.

17. The computer program product according to claim 15, wherein the GUI is menu-driven.

18. The computer program product according to claim 17, wherein the GUI displays a window with the XML data in native format and a selection of the XML validation schemas.

19. The computer program product according to claim 15, wherein the generated XML validation mapping definition document comprises a programming language of the validation code, a type and name of the XML document fragment and locations of the one or more user selected target destinations and the XML validation schema.

20. The computer program product according to claim 19, wherein the validation code programming language is selected from the group consisting of a Structured Query Language (SQL) script, C# code, Java code, Virtual Basic code, Hypertext Preprocessor code, and C++ code.

21. The computer program product according to claim 15, wherein:

the validated XML data is stored in the one or more user selected target destinations selected from the group consisting of an XML column of a database table, a web service call, a standalone application call, a function's input parameter of XML type, a stored procedure's input or input/output parameter of XML type, and a heterogeneous Relational Database Management System (RDBMS) environment.

* * * * *